(12) United States Patent
Ironmonger et al.

(10) Patent No.: US 10,576,386 B2
(45) Date of Patent: Mar. 3, 2020

(54) GAMES CONTROLLER

(71) Applicant: Ironburg Inventions Limited, Wincanton, Somerset (GB)

(72) Inventors: Duncan Ironmonger, Wincanton (GB); Carl Jeffrey, Cheltenham (GB)

(73) Assignee: Ironburg Inventions Limited, Wincanton (GB)

( * ) Notice: Subject to any disclaimer, the term of this patent is extended or adjusted under 35 U.S.C. 154(b) by 25 days.

(21) Appl. No.: 15/759,411

(22) PCT Filed: Sep. 13, 2016

(86) PCT No.: PCT/GB2016/052827
§ 371 (c)(1),
(2) Date: Mar. 12, 2018

(87) PCT Pub. No.: WO2017/051151
PCT Pub. Date: Mar. 30, 2017

(65) Prior Publication Data
US 2018/0178133 A1    Jun. 28, 2018

Related U.S. Application Data

(60) Provisional application No. 62/222,659, filed on Sep. 23, 2015.

(51) Int. Cl.
*A63F 13/24*     (2014.01)
*A63F 13/98*     (2014.01)
(Continued)

(52) U.S. Cl.
CPC .............. *A63F 13/98* (2014.09); *A63F 13/23* (2014.09); *A63F 13/24* (2014.09); *A63F 13/92* (2014.09);
(Continued)

(58) Field of Classification Search
CPC .......... A63F 13/02; A63F 13/20; A63F 13/22; A63F 13/23; A63F 13/24; A63F 13/98;
(Continued)

(56) References Cited

U.S. PATENT DOCUMENTS 4,032,728 A    6/1977 Oelsch
4,786,768 A    11/1988 Langewis et al.
(Continued)

FOREIGN PATENT DOCUMENTS

CN    202 528 096 U    11/2012
CN    203 077 157 U    7/2013
(Continued)

OTHER PUBLICATIONS

European Patent Office, International Search Report, PCT/GB2016/052827 (dated Sep. 13, 2016).
(Continued)

*Primary Examiner* — Omkar A Deodhar
(74) *Attorney, Agent, or Firm* — Walters & Wasylyna LLC

(57) ABSTRACT

The invention provides an improved controller (10) for a games console. The invention is a games controller (10) that is intended to be held by a user in both hands. Additionally, the controller of the invention (10) may comprise a plurality of controls located on the front and top of the controller. The controller of the present invention (10) is advantageous as it additionally comprises at least one additional control (11 A, 11 B) located on the rear of the controller (10) in a position to be operated by the middle fingers of a user (12). The additional control (11 A, 11 B) may be a paddle lever and may replicate the function of either one of two of the controls located on the front or top of the controller (10).

20 Claims, 26 Drawing Sheets

(51) Int. Cl.
    *A63F 13/23* (2014.01)
    *A63F 13/92* (2014.01)
(52) U.S. Cl.
    CPC .............. *A63F 2300/1006* (2013.01); *A63F 2300/1043* (2013.01)
(58) Field of Classification Search
    CPC ............ A63F 13/235; A63F 2300/1043; A63F 2300/204
    See application file for complete search history.

(56) References Cited

U.S. PATENT DOCUMENTS

| | | | |
|---|---|---|---|
| 5,430,262 | A | 7/1995 | Matsui et al. |
| 5,451,053 | A | 9/1995 | Garrido |
| 5,773,769 | A | 6/1998 | Raymond |
| 5,841,372 | A | 11/1998 | Matsumoto |
| 5,874,906 | A | 2/1999 | Willner et al. |
| 5,883,690 | A | 3/1999 | Meyers et al. |
| 5,989,123 | A | 11/1999 | Tosaki et al. |
| 6,203,432 | B1 | 3/2001 | Roberts et al. |
| 6,251,015 | B1 | 6/2001 | Caprai |
| 6,512,511 | B2 | 1/2003 | Willner et al. |
| 6,752,719 | B2 | 6/2004 | Himoto et al. |
| 6,760,013 | B2 | 7/2004 | Willner et al. |
| 6,853,308 | B1 | 2/2005 | Dustin |
| 7,510,477 | B2 | 3/2009 | Argentar |
| 7,758,424 | B2 | 7/2010 | Riggs et al. |
| 7,859,514 | B1 | 12/2010 | Park |
| 8,641,525 | B2 | 2/2014 | Burgess et al. |
| 8,777,620 | B1 | 7/2014 | Baxter |
| 9,089,770 | B2 | 7/2015 | Burgess et al. |
| 9,804,691 | B1 | 10/2017 | Strahle et al. |
| 2001/0003713 | A1 | 6/2001 | Willner et al. |
| 2001/0025778 | A1 | 10/2001 | Ono |
| 2002/0052237 | A1 | 5/2002 | Magill |
| 2002/0128064 | A1 | 9/2002 | Sobota |
| 2003/0067111 | A1 | 4/2003 | Swan |
| 2004/0259059 | A1 | 12/2004 | Aoki |
| 2005/0083297 | A1 | 4/2005 | Duncan |
| 2005/0215321 | A1 | 9/2005 | Hussaini et al. |
| 2005/0230230 | A1 | 10/2005 | Ueshima et al. |
| 2005/0255918 | A1 | 11/2005 | Riggs et al. |
| 2006/0025217 | A1 | 2/2006 | Hussaini et al. |
| 2006/0116204 | A1 | 6/2006 | Chen et al. |
| 2007/0281787 | A1 | 12/2007 | Numata et al. |
| 2008/0261695 | A1 | 10/2008 | Coe |
| 2009/0088250 | A1 | 4/2009 | Carlson et al. |
| 2009/0258705 | A1 | 10/2009 | Guinchard |
| 2010/0073283 | A1 | 3/2010 | Enright |
| 2010/0267454 | A1 | 10/2010 | Navid |
| 2010/0304865 | A1 | 12/2010 | Picunko |
| 2011/0105231 | A1 | 5/2011 | Ambinder et al. |
| 2011/0256930 | A1 | 10/2011 | Jaouen |
| 2011/0281649 | A1 | 11/2011 | Jaouen |
| 2012/0088582 | A1 | 4/2012 | Wu et al. |
| 2012/0142418 | A1 | 6/2012 | Muramatsu |
| 2012/0142419 | A1 | 6/2012 | Muramatsu |
| 2012/0260220 | A1 | 10/2012 | Griffin |
| 2012/0299244 | A1 | 11/2012 | Rice et al. |
| 2012/0322553 | A1 | 12/2012 | Burgess et al. |
| 2012/0322555 | A1 | 12/2012 | Burgess et al. |
| 2013/0147610 | A1 | 6/2013 | Grant et al. |
| 2013/0150155 | A1 | 6/2013 | Barney et al. |
| 2013/0196770 | A1 | 8/2013 | Barney et al. |
| 2014/0274397 | A1 | 9/2014 | Sebastian |
| 2015/0234479 | A1 | 8/2015 | Schantz et al. |
| 2015/0238855 | A1 | 8/2015 | Uy et al. |
| 2016/0082349 | A1 | 3/2016 | Burgess et al. |
| 2016/0193529 | A1 | 7/2016 | Burgess et al. |
| 2016/0346682 | A1 | 12/2016 | Burgess et al. |
| 2017/0001107 | A1 | 1/2017 | Burgess et al. |
| 2017/0001108 | A1 | 1/2017 | Burgess et al. |
| 2017/0087456 | A1 | 3/2017 | Burgess et al. |
| 2017/0151494 | A1 | 6/2017 | Ironmonger et al. |
| 2017/0157509 | A1 | 6/2017 | Burgess et al. |

FOREIGN PATENT DOCUMENTS

| | | |
|---|---|---|
| EP | 1 208 883 | 5/2002 |
| EP | 1852162 | 11/2007 |
| EP | 2 479 636 | 7/2012 |
| EP | 2 440 438 | 4/2013 |
| EP | 2 698 185 | 2/2015 |
| GB | 2 244 546 | 12/1991 |
| GB | 2 481 633 | 1/2012 |
| JP | H1020951 | 1/1998 |
| JP | 2001 084077 | 3/2001 |
| WO | WO 02/34345 | 5/2002 |
| WO | WO 03/046822 | 6/2003 |
| WO | WO 2007/040499 | 4/2007 |
| WO | WO 2008/131249 | 10/2008 |
| WO | WO 2012/036710 | 3/2012 |
| WO | WO2014/187923 | 11/2014 |
| WO | 2015004261 | 1/2015 |
| WO | 2015110553 | 7/2015 |

OTHER PUBLICATIONS

European Patent Office, Written Opinion of the International Searching Authority, PCT/GB2016/052827 (dated Sep. 13, 2016).
Burns, "Review: Scuf Xbox 360 Controller," Xboxer360.com (2010).
"Rapid Fire Mod for Wireless Xbox 360 Controller," forum on xbox-scene.com, (2008).
"Thrustmaster USB game controller roundup," dansdata.com/tmsticks.htm (2002).
Coles, Olin, "Thrustmaster Run-N-Drive PC/PS3 Wireless Gamepad" BenchmarkReviews.com (2009).
Xbox 360 Wireless Controller Tour, published on May 13, 2005 at http://www.ign.com/articles/2005/05/13/xbox-360-wireless-controller-tour.

GAMES CONTROLLER

This application is a U.S. national phase application of Intl. App. No. PCT/GB2016/052827 filed on Sep. 13, 2016, which claims priority from U.S. Ser. No. 62/222,659 filed on Sep. 23, 2015. The entire contents of Intl. App. No. PCT/GB2016/052827 and U.S. Ser. No. 62/222,659 are incorporated herein by reference.

FIELD OF THE INVENTION

The invention relates to controllers for controlling the play of computerised games; more particularly, but not exclusively, the invention relates to an actuator system of a game controller for a gaming console.

BACKGROUND OF THE INVENTION

There are many different types of gaming consoles currently available for operating a video game. For example, Microsoft®, Sony® and Nintendo® manufacture the Xbox®, Playstation® and Wii® gaming consoles, respectively. The gaming consoles typically include a game controller so that a user can control the operation of the video game.

Controllers for most current games consoles are generally intended to be held and operated by the user using both hands. A conventional controller will generally comprise a hard outer case with a plurality of controls mounted about the controller. Typically the controls include buttons, analogue control sticks, bumpers and triggers.

Some known game controllers include a form of actuator system for the operation of control of the functions of the video games. Actuators, buttons or other depressible or manually operable devices are typically used for controlling discrete actions such as the firing of a weapon or issuing an attack command. It is known to provide a button, actuator, or other controls, on the front and top of the controller. Controls mounted on the top of the controller are intended to be operable by the index fingers of a user; such buttons are commonly known as triggers or bumpers. Controls mounted on the front of the controller are intended to be operable by the thumbs of a user; such controls may include left and right analogue thumb sticks, which normally control movement and are intended to be operated by the user's left and right thumbs respectively. There may be additional buttons located on a forward right portion of the front of the controller, which normally control additional actions and are intended to be operated by the user's right thumb. There may be provided a direction pad located on the rearward left portion of the front of the controller. The direction pad is intended to be operated by the user's left thumb, typically either as an alternative to the left thumb stick or to provide additional actions. The controllers typically have a pair of handles or grip portions to enable a user to hold the controller; typically the user will employ the middle, ring and/or little finger of each hand to grasp a respective handle.

Due to the rapidly expanding gaming market and development of involved games invoking considerable player input, it is desirable for players to be able to customise their controllers in order to gain increased control in a variety of gaming circumstances.

The present invention seeks to improve upon, or at least mitigate, some of the problems associated with controllers of the prior art by providing a game controller which includes additional actuators on the bottom of the controller, which allow a user to employ the middle, ring or little finger of the hand for operation of control of the functions of a video game.

SUMMARY

A first aspect of the present invention provides an apparatus for supplying user inputs to a computer program, such as a game program, for controlling the game program, comprising:
a case; and
a plurality of controls located on a front of the apparatus;
at least one first additional control located on a rear of the apparatus;
at least one second additional control located on a rear of the apparatus;
the apparatus being shaped to be held in both hands of a user such that the user's thumbs are positioned to operate controls located on the front of the apparatus;
at least one first actuator mounted to the rear of the apparatus in a position operable by a middle, ring or little finger of a user;
at least one second actuator mounted to the rear of the apparatus in a position operable by a middle, ring or little finger of a user;
the first actuator may be configured to activate the at least one first additional control;
the second actuator may be configured to activate the at least one second additional control;
the first actuator comprising a first portion configured to be disposed in overlapping relationship with the second actuator.

Optionally, the first actuator is pivotally coupled to the controller.
Optionally, the second actuator is pivotally coupled to the controller.
Optionally, the first actuator is removably mounted to the apparatus.
Optionally, the second actuator is removably mounted to the apparatus.
Optionally, the first actuator comprises a first boss extending from an inner surface thereof.
Optionally, the second actuator comprises a second boss extending from an inner surface of the first portion thereof.
Optionally, the first boss is longer than the second boss.
Optionally, a plurality of controls located on a top of the apparatus, the apparatus being shaped to be held in both hands of a user such that the user's index fingers are positioned to operate controls located on the top of the apparatus.

A second aspect of the present invention provides an actuator for use with apparatus for supplying user inputs to a computer program, such as a game program, for controlling the game program, the apparatus comprising:
a case; and
a plurality of controls located on a front of the apparatus;
at least one first additional control located on a rear of the apparatus;
at least one second additional control located on a rear of the apparatus;
the apparatus being shaped to be held in both hands of a user such that the user's thumbs are positioned to operate controls located on the front of the apparatus;
the actuator may be configured to activate the at least one first additional control and may be operable by a middle, ring or little finger of a user, the actuator comprising a first portion configured to be disposed in overlapping relationship with a further actuator for activation of the at least one second additional control.

A third aspect of the present invention provides an apparatus for supplying user inputs to a computer program, such as a game program, for controlling the game program, comprising:
 a case; and
 a plurality of controls located on a front of the apparatus:
 at least one first additional control located on a rear panel of the apparatus;
 the apparatus being shaped to be held in both hands of a user such that the user's thumbs are positioned to operate controls located on the front of the apparatus;
 at least one first actuator mounted to the rear panel of the apparatus in a position operable by a middle, ring or little finger of a user;
 the first actuator configured to activate the at least one first additional control;
 the first actuator comprising a first lug for rotationally mounting the first actuator to the controller;
 the apparatus comprising at least one first receiver in which the first lug is located.
 Optionally, the lug is slidably insertable into the receiver.
 Optionally, the lug comprises a cylindrical portion.
 Optionally, the receiver comprises a cylindrical conduit.
 Optionally, the receiver comprises a channel comprising a wall defining a partial cylinder.
 Optionally, the apparatus comprises at least one second additional control located on a rear of the apparatus and at least one second actuator mounted to the rear of the apparatus in a position operable by a middle, ring or little finger of a user, the second actuator being configured to activate the at least one second additional control, the at least one second actuator comprising a second lug.
 Optionally, the lug of at least one second actuator is located in the receiver.
 Optionally, the apparatus comprises at least one second receiver for receiving the second lug.
 Optionally, the receiver defines a cylindrical axis about which the first actuator is rotatably mounted.
 Optionally, the receiver defines a cylindrical axis about which the second actuator is rotatably mounted.
 Optionally, the second receiver defines a cylindrical axis about which the second actuator is rotatably mounted.
 Optionally, wherein the first actuator comprises a tail portion coupled to the lug by an intermediate portion, the intermediate portion provides a lever such that the first actuator forms a crank.
 Optionally, the receiver comprises a magnet for retaining the first actuator therein.
 Optionally, the rear panel comprises a magnet for retaining the first actuator in close proximity thereto.
 Optionally, the rear panel comprises at least one upstanding wall providing a retainer.
 Optionally, the receiver comprises an index predefining the location of the first and second actuator in the receiver.
 Optionally, the first actuator comprises a projection extending from an outer surface thereof and provides a restrictor limiting angular range of movement of the actuator.

A fourth aspect of the present invention provides an actuator for use with apparatus for supplying user inputs to a computer program, such as a game program, for controlling the game program, the apparatus comprising:
 a case;
 a plurality of controls located on a front of the apparatus;
 at least one first additional control located on a rear panel of the apparatus; and
 at least one first receiver in which the first lug is located;
 the apparatus being shaped to be held in both hands of a user such that the user's thumbs are positioned to operate controls located on the front of the apparatus;
 the actuator may be configured to activate the at least one first additional control and may be mounted to the rear panel of the apparatus in a position operable by a middle, ring or little finger of a user;
 the actuator comprises a first lug for rotationally mounting the first actuator to the controller.

In some embodiments the apparatus is a games controller.

Further features and advantages of the present invention will be apparent from the specific embodiment illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which.

DETAILED DESCRIPTION OF EMBODIMENTS

Detailed descriptions of specific embodiments of game controllers and actuators are disclosed herein. It will be understood that the disclosed embodiments are merely examples of the way in which certain aspects of the invention can be implemented and do not represent an exhaustive list of all of the ways the invention may be embodied. Indeed, it will be understood that the game controllers and actuators described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
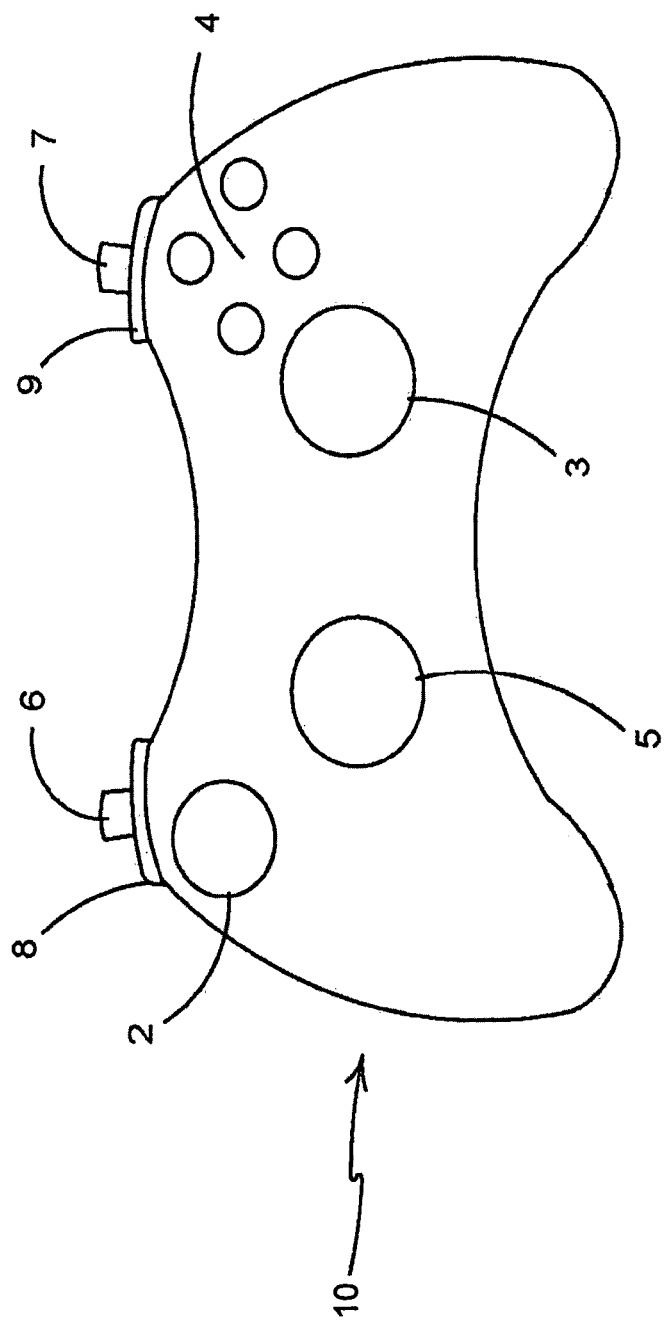
FIG. 1 is a schematic illustration of the front of a games console controller according to a first embodiment.

Referring to FIG. 1, there is shown a controller 10 according to an embodiment of the invention. The controller 10 comprises an arrangement of game controls that are mounted on the front and top of the controller 10. The controller 10 comprises a left analogue thumb stick 2 and a right analogue thumb stick 3 mounted on the front of the controller 10. The left analogue thumb stick 2 and the right analogue thumb stick 3 normally control movement actions and are intended to be operated by the user's left and right thumbs respectively. The controller 10 comprises four buttons 4, located on a forward right portion of the front of the controller 10, which normally control additional in-game actions and that are intended to be operated by the user's right thumb. The controller 10 comprises a direction pad 5 located on the rearward left portion of the front of the controller 10. The direction pad 5 is intended to be operated by the user's left thumb, and typically is used either as an alternative to the left thumb stick 2, or to provide additional actions. The controller 10 also comprises a left trigger body 6, a right trigger body 7, a left bumper 8 and a right bumper 9 located on the top of the controller 10. The left and right trigger bodies 6, 7 are typically operated by a user's index fingers or forefingers. The left and right bumpers 8, 9 may also be operated by a user's index fingers or forefingers. It will be understood that the arrangement of game controls illustrated in respect of the present embodiment is optional and may vary in other game controllers embodying the present invention, which may be applied to a variety of actuators as described below.

Figure 2:
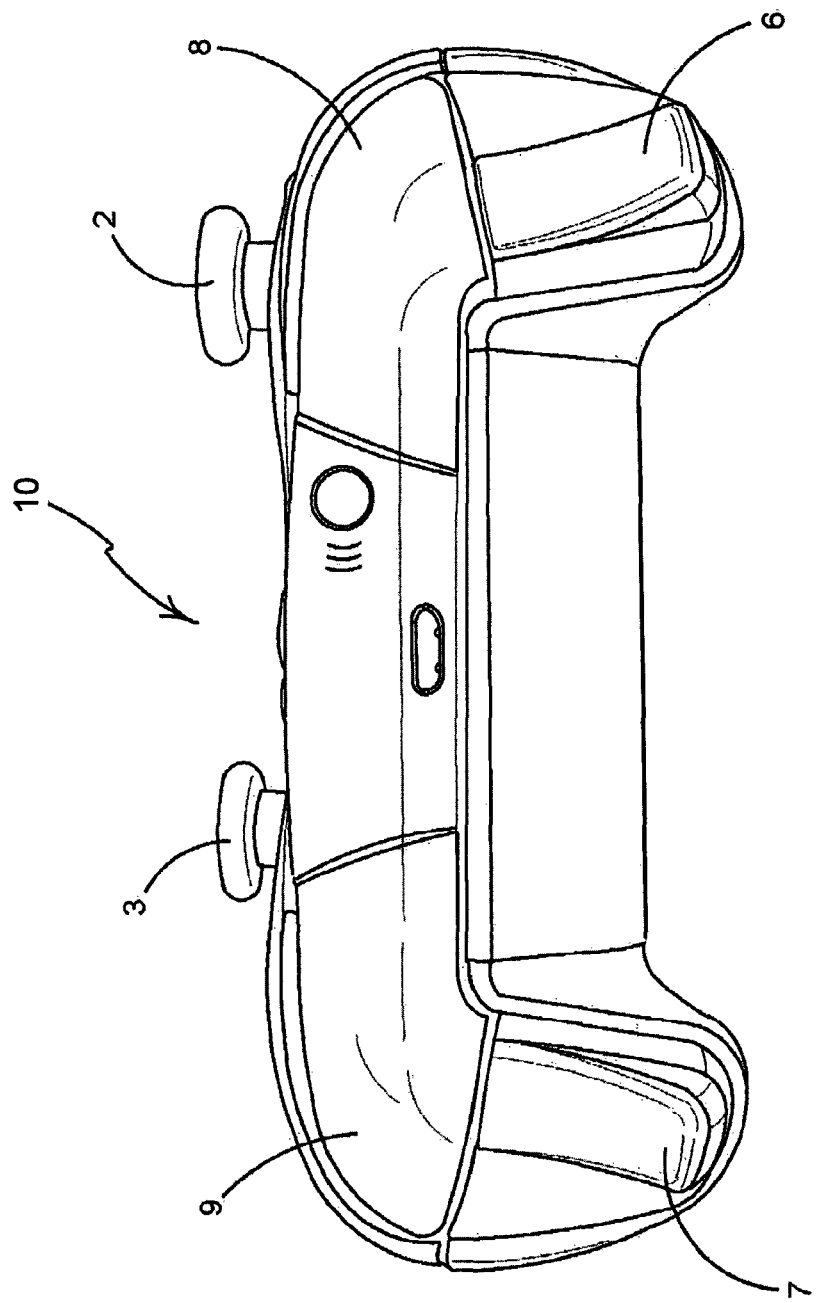
FIG. 2 is a top view of the games console controller of FIG. 1.

FIG. 2 illustrates a top view of the controller 10 of FIG. 1. It can be seen that the left trigger body 6 is mounted below the left bumper 8 and the right trigger body 7 is mounted below the right bumper 9.

A user may operate the four buttons 4 on the front of the controller by removing their right thumb from the right thumb stick 3 and placing their right thumb upon one or more of the four buttons 4. This operation takes time and, in some games, can cause a loss of control. This is a particular problem in applications requiring precision, for example combat games, where the right thumb stick 3 is used for aiming a weapons cross-hair or other reticle. A similar problem may arise in games where the direction pad 5 provides additional actions and the user is required to remove their left thumb from the left thumb stick 2 in order to operate the direction pad 5.

In light of the above, there is a need for an improved controller which removes the requirement for a user to remove their thumbs from the left or right thumb sticks 2, 3 in order to operate additional actions controlled by the four buttons 4 and/or the direction pad 5.

Figure 3:
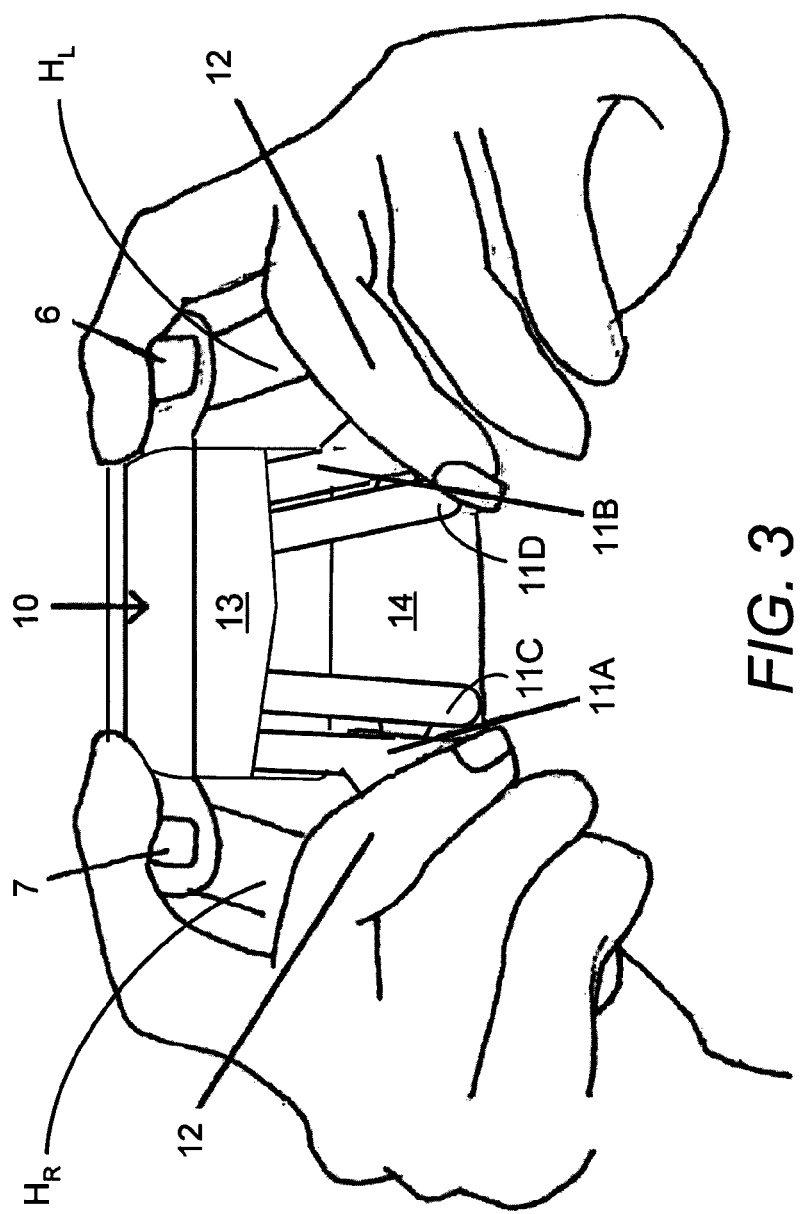
FIG. 3 is a schematic illustration from below of the rear panel of the games controller of FIG. 1 showing a user's hands.

The rear of the games controller 10 is illustrated in FIG. 3. The controller 10 comprises a first handle $H_R$ and a second handle $H_L$. The first handle $H_R$ and the second handle $H_L$ are disposed on opposing lateral sides of a central body portion 14. The first handle $H_R$ is intended to be grasped in the right hand R of a user 12. The second handle $H_L$ is intended to be grasped in the left hand L of a user 12. The user 12 wraps one or more of the middle, ring and little fingers of the right hand R about the first handle $H_R$. The user wraps one or more of the middle, ring and little fingers of the left hand L about the second handle $H_L$.

The controller 10 comprises one or more actuators in the form of paddle levers 11A, 11B, 11C, 11D. In the illustrated embodiment the controller 10 comprises four actuators: a first paddle lever 11A, a second paddle lever 11B, a third paddle lever 11C and a fourth paddle lever 11D, mounted on the rear of the controller 10. The paddle levers 11A, 11B, 11C, 11D are each individually or separately mounted in a detachable fashion; and in the illustrated embodiment any of the four actuators may be removed or omitted from the controller 10. The paddle levers 11A, 11B, 11C, 11D are positioned to be operated by the middle, ring or little fingers of a user 12, as shown in FIG. 3.

In the illustrated embodiment each of the four actuators extends substantially in a longitudinal direction. The longitudinal direction extends from the top—to which the right and left triggers 6, 7 are mounted—of the controller 10 to the bottom of the controller 10.

Figure 4:
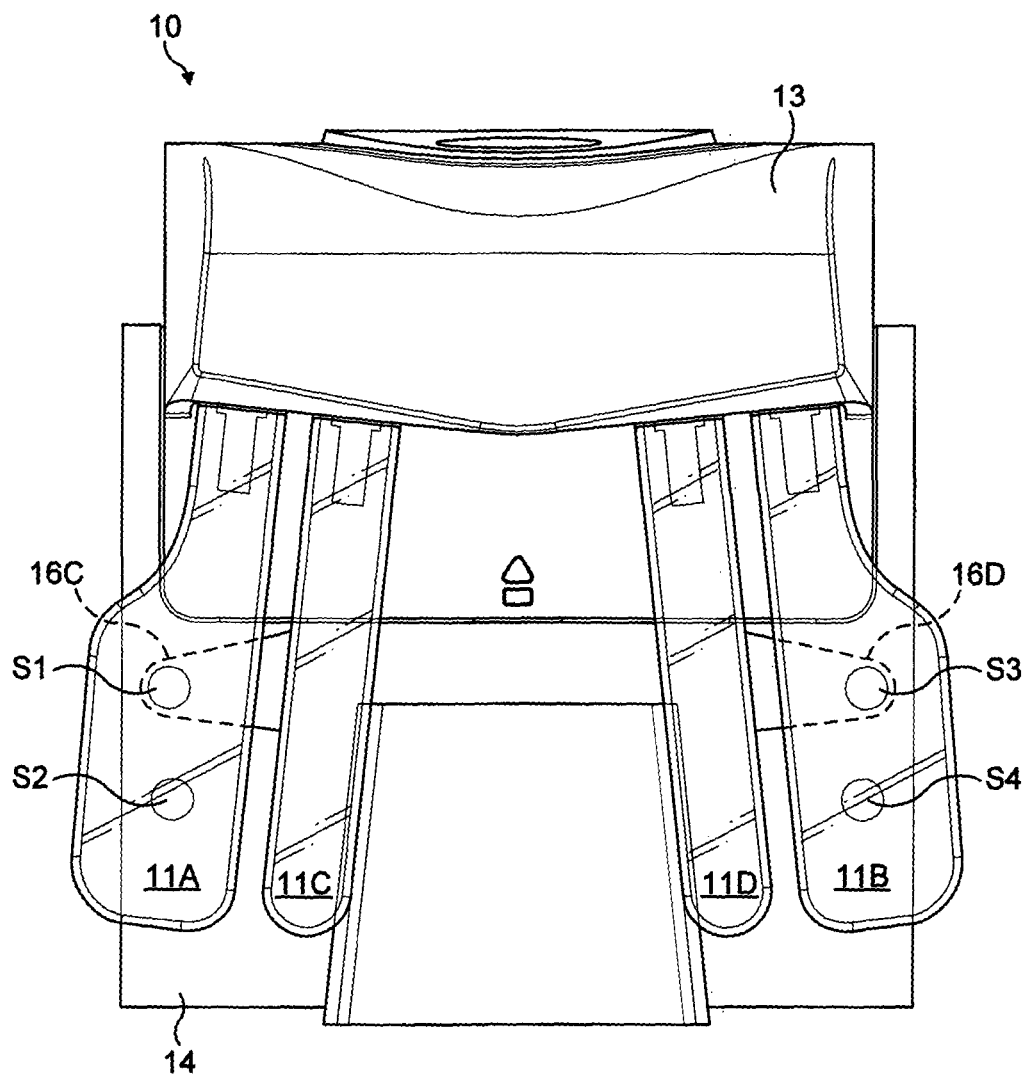
FIG. 4 is an enlarged view of a portion of rear panel of the games controller of FIG. 3.

A user may displace or depress either of the paddle levers 11A, 11B, 11C, 11D by engaging an outer surface thereof; such displacement causes the actuated paddle 11A, 11B, 11C, 11D to activate a respective switch mechanism S1, S2, S3, S4 (see FIG. 4).

The first and second paddle levers 11A, 11B are substantially the same in construction, albeit mirror images of each other, and will be described with reference to the first paddle lever 11A illustrated in FIG. 4. The third and fourth paddle levers 11C, 11D are substantially the same in construction, albeit mirror images of each other, and will be described with reference to the third paddle lever 11C illustrated in FIG. 4. The first paddle lever 11A is displaceable about a coupling mounted to the controller body portion 14. The paddle lever may be deformed or bent about a support disposed at a position indicated by reference number 13.

Referring now to FIG. 4, the controller comprises a first switch mechanism S1 and a second switch mechanism S2 mounted in vertical registry with a first end portion of the first paddle lever 11A. A third switch mechanism S3 and a fourth switch mechanism S4 are mounted in vertical registry with a first end portion of the second paddle lever 11B. The first, second, third and fourth switch mechanisms S1, S2, S3, S4 are mounted within the body 14 of the controller 10. In the embodiment of FIG. 4 the switch mechanisms S1, S2, S3, S4 are arranged such that a portion of each of the switch mechanisms S1, S2, S3, S4 extends through a respective aperture in the controller body portion 14 so as to be flush with an outer surface of the controller body portion 14.

In some embodiments the switch mechanisms S1, S2, S3, S4 may extend at least partially through the controller body portion 14 and be disposed in close proximity to, or in contact with, an inner surface of a respective one of the fourth actuators.

In other embodiments the switch mechanisms S1, S2, S3, S4 may be inset with respect to the outer surface of the controller body portion 14 so as to be recessed within the controller body portion 14.

The paddle lever 11A is arranged such that an inner surface of the paddle lever 11A is disposed in close proximity (optionally in touching contact) with the first switch mechanism S1 when in a neutral or rest position. Similarly, the second, third and fourth paddle levers 11B, 11C, 11D are arranged such that an inner surface is disposed in close proximity (optionally in touching contact) with the second, third and fourth switch mechanisms S2, S3, S4 respectively.

Optionally, the first paddle lever 11A comprises a first protuberance or boss (not shown) extending from a first, inner surface thereof. The first boss is arranged so as to engage with the second switch mechanism S2 when the first paddle lever 11A is depressed proximate the first end of the first paddle lever 11A.

Optionally, the second paddle lever 11B comprises a second protuberance or boss (not shown) extending from a first, inner surface thereof. The second boss is arranged so as to engage with the fourth switch mechanism S4 when the first paddle lever 11B is depressed proximate the first end of the first paddle lever 11B.

The third paddle lever 11C comprises a first laterally extending projection in the form of a first wing 16C. The first wing 16C extends between the outer surface of the controller body portion 14 and the inner surface of the first paddle lever 11A. In this way the third paddle lever 11C is arranged in overlapping relationship with the first paddle lever 11A.

The fourth paddle lever 11D comprises a second laterally extending projection in the form of a second wing 16D. The second wing 16D extends between the outer surface of the controller body portion 14 and the inner surface of the second paddle lever 11B. In this way the fourth paddle lever 11D is arranged in overlapping relationship with the second paddle lever 11B.

Optionally, the third paddle lever 11C comprises a third protuberance or boss (not shown) extending from a first, inner surface of the first wing 16C. The third boss is arranged so as to engage with the first switch mechanism S1 when the third paddle lever 11C is depressed proximate the first end of the third paddle lever 11C.

Optionally, the fourth paddle lever 11D comprises a fourth protuberance or boss (not shown) extending from a first, inner surface of the second wing 16D. The fourth boss is arranged so as to engage with the third switch mechanism S3 when the fourth paddle lever 11D is depressed proximate the first end of the fourth paddle lever 11D.

Figure 5A:
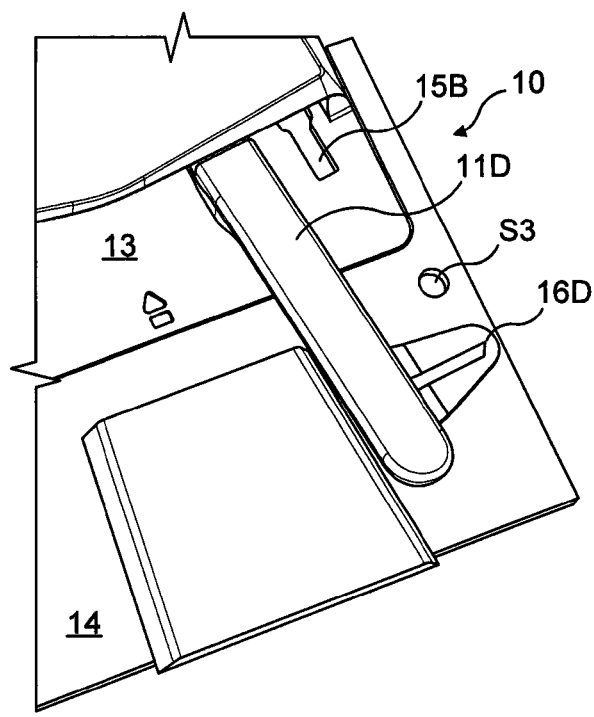
FIGS. 5A to 5C are perspective views of a portion of a rear panel of the games controller of FIG. 3.
Figure 5B:
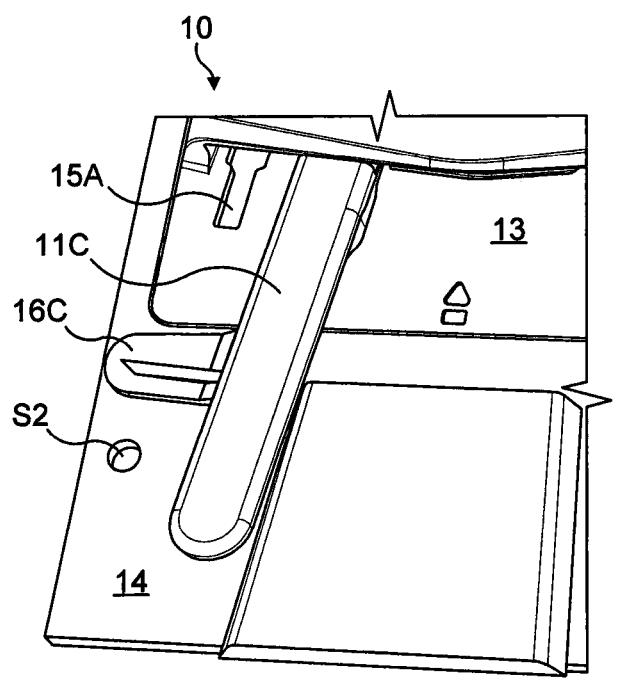
Figure 5C:
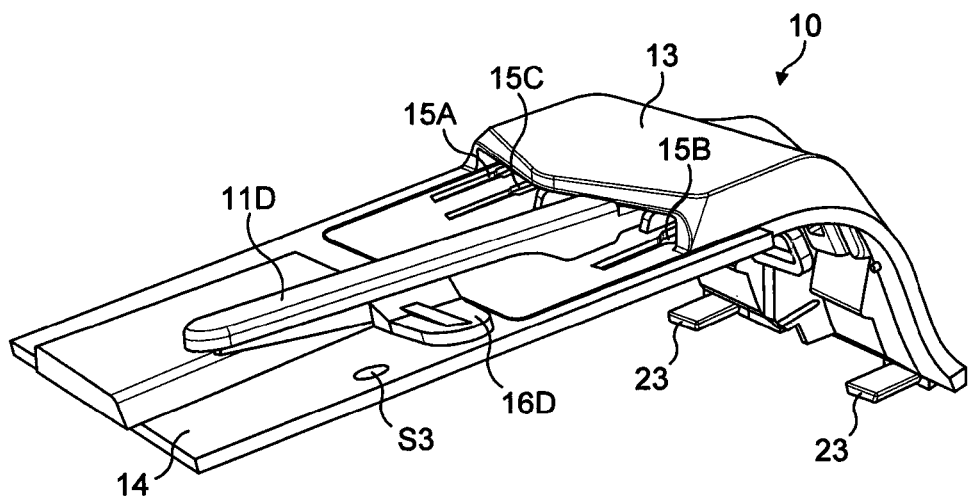

Referring now to FIGS. 5A and 5C the first, second and third paddle levers 11A, 11B, 11C have been removed. The second wing 16D of the fourth paddle lever 11D is arranged to extend below the second paddle lever (not shown). In FIG. 5A the second paddle lever 11B has been omitted or removed to illustrate the second wing 16D extending over the location of the fourth switch mechanism S4. The controller comprises a cover panel in the form of a detachable hatch 13. The hatch 13 may provide an access to a battery compartment (not shown). The hatch 13 comprises four channels or conduits for receiving a respective one of the four actuators. FIGS. 5A and 5C show a vacant second conduit 15B in which the second paddle lever 11B is receivable. The second conduit 15B comprises a first part of a complementary locking mechanism.

FIG. 5C shows a vacant first conduit 15A and a vacant third conduit 15C in which the first and third paddle levers 11A, 11C are receivable respectively. FIG. 5B shows a portion of a controller 10 in which the first, second and fourth paddle levers 11A, 11B, 11D have been removed. FIG. 5B shows a vacant first conduit 15A in which the first paddle lever 11A is receivable.

Figure 7:
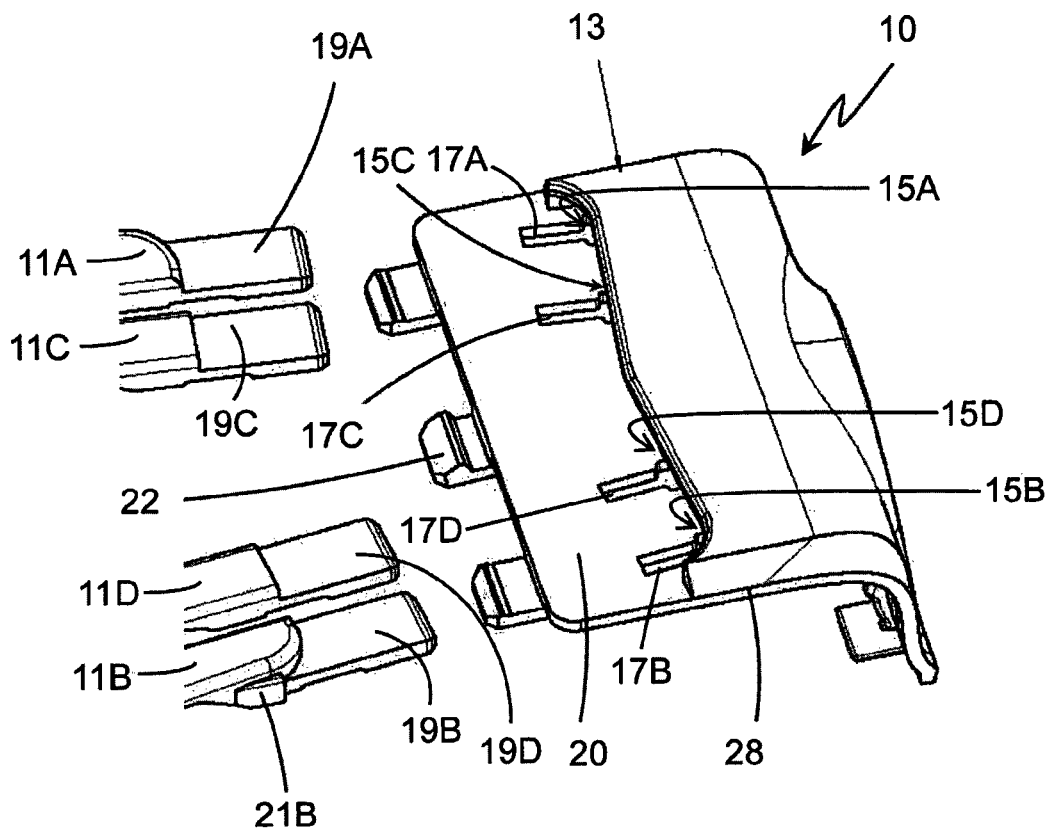
FIG. 7 is a perspective view from below of a portion of a rear panel of the games controller showing a first mounting arrangement for releasably coupling actuators to the games controller of FIG. 1.
Figure 8:
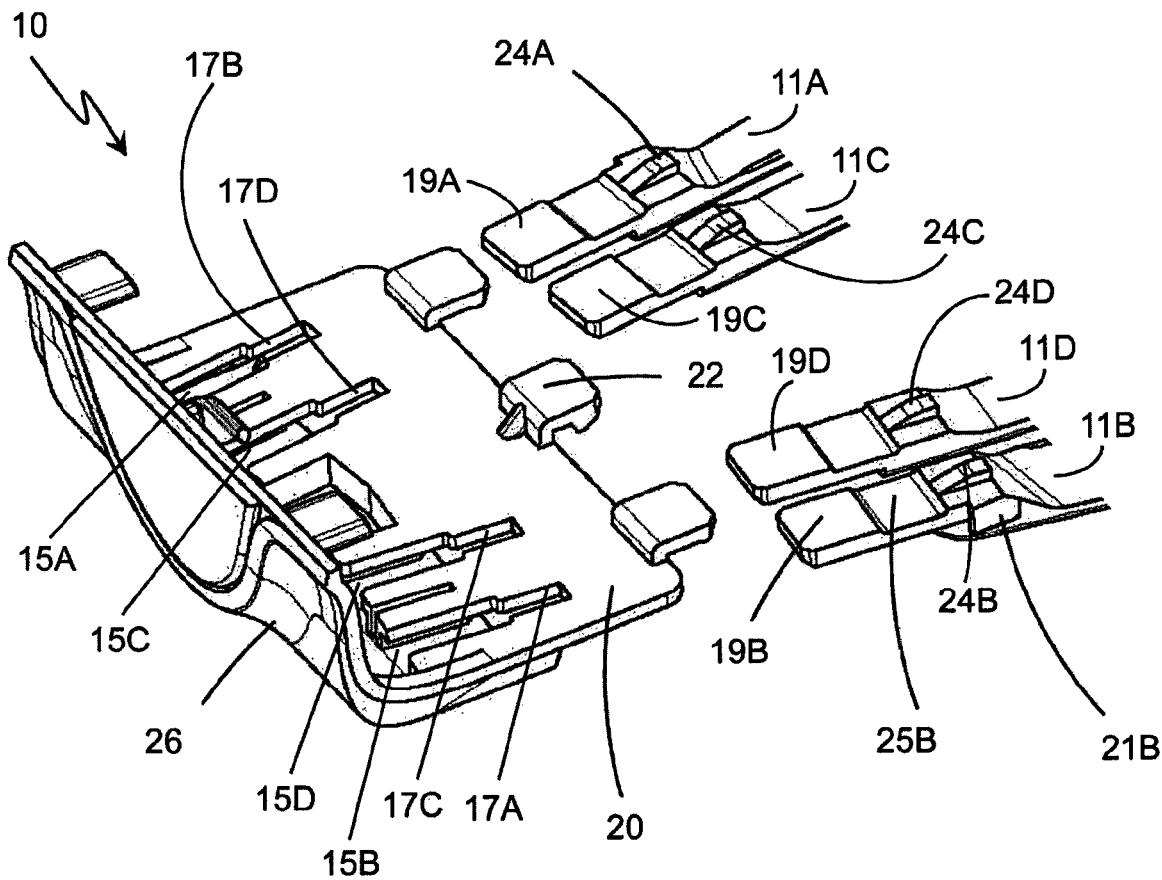
FIG. 8 is a perspective view from above of a portion of a rear panel of the games controller according to another embodiment showing a first mounting arrangement for releasably coupling actuators to the games controller of FIG. 1.

The first, second, third and fourth conduits 15A, 15B, 15C, 15D each comprises a first part of a complementary locking mechanism as shown in FIGS. 7 and 8. The complementary locking mechanism may take the form of a bayonet style fastener.

The first part of the complementary locking mechanism comprises a cutaway in the hatch 13. In the illustrated embodiment the cutaway takes the form of an aperture 17A, 17B, 17C, 17D. In alternative embodiments the cutaway may take the form of a recess, trough or open channel.

In other embodiments the first part of the complementary locking mechanism may comprise a barb or detent extending from the outer surface of the hatch 13.

Each of the paddle levers 11A, 11B, 11C, 11D comprises a second part of a complementary locking mechanism as shown in FIGS. 7 and 8. The second part of the complementary locking mechanism comprises a barb or detent 24A, 24B, 24C, 24D extending from the inner surface of the paddle levers 11A, 11B, 11C, 11D.

The second part of the complementary locking mechanism engages with the first part of the complementary locking mechanism so as to interlock with one another. In this way unintentional egress of the paddle levers 11A, 11B, 11C, 11D from the conduits 15A, 15B, 15C, 15D is inhibited or prevented.

A head portion 19A, 19B, 19C, 19D of each paddle lever 11A, 11B, 11C, 11D is inserted into one of the respective conduits 15A, 15B, 15C, 15D. The each of the barbs 24A, 24B, 24C, 24D is received in a respective one of the apertures 17A, 17B, 17C, 17D. In order to remove the paddle levers 11A, 11B, 11C, 11D from the conduits 15A, 15B, 15C, 15D the paddle levers 11A, 11B, 11C, 11D need to be displaced away from the body portion 14 of the controller 10 such that the barbs 24A, 24B, 24C, 24D clear the apertures 17A, 17B, 17C, 17D. Once the barbs 24A, 24B, 24C, 24D clear the apertures 17A, 17B, 17C, 17D the paddle levers 11A, 11B, 11C, 11D can be removed from the conduits 15A, 15B, 15C, 15D by relative motion between the hatch 13 and the paddle levers 11A, 11B, 11C, 11D.

The hatch 13 also comprises at least one guide 23 and at least one retaining clip 22 for being releasably attached to the controller body 14.

One or more of the paddle levers 11A, 11B, 11C, 11D may comprise a brace member in the form of a lateral protuberance 21B for stabilising the paddle levers 11A, 11B, 11C, 11D. The lateral protuberance 21B may reduce or prevent rotation or other lateral movement of the paddle levers 11A, 11B, 11C, 11D within the conduits 15A, 15B, 15C, 15D.

In the illustrated embodiment the outermost actuators, the first and second paddle levers 11A, 11B, each comprises a brace member disposed on an outer side edge thereof. The brace members comprise an engaging edge which abuts an end of the side wall of a respective conduit. The brace members provide lateral or transverse support to the paddles 11A, 11B, 11C, 11D. In other embodiments brace members may be provided on the inner side edge of the paddle levers 11A, 11B, 11C, 11D in addition, or alternatively, to the outer side edge. In still further embodiments the innermost actuators, third and fourth paddle levers 11C, 11D, may comprise brace members.

In still further embodiments the paddle levers may be secured to the hatch 13 by a mechanical fixing such as a screw having an external thread. The screw may pass through an aperture in the paddle lever 11A, 11B, 11C, 11D. The screw may be received in an aperture in the hatch 13 or controller body portion 14; the aperture may comprise an internal thread. Alternatively, the screw may be configured to create an internal thread in the aperture when driven into the aperture—self-tapping the aperture. In still other embodiments the external thread of the screw may be received in an internal thread provided by a nut disposed on a surface of the hatch 13 or body portion 14 opposing the surface to which the paddle lever 11A, 11B, 11C, 11D is being secured.

Figure 6A:
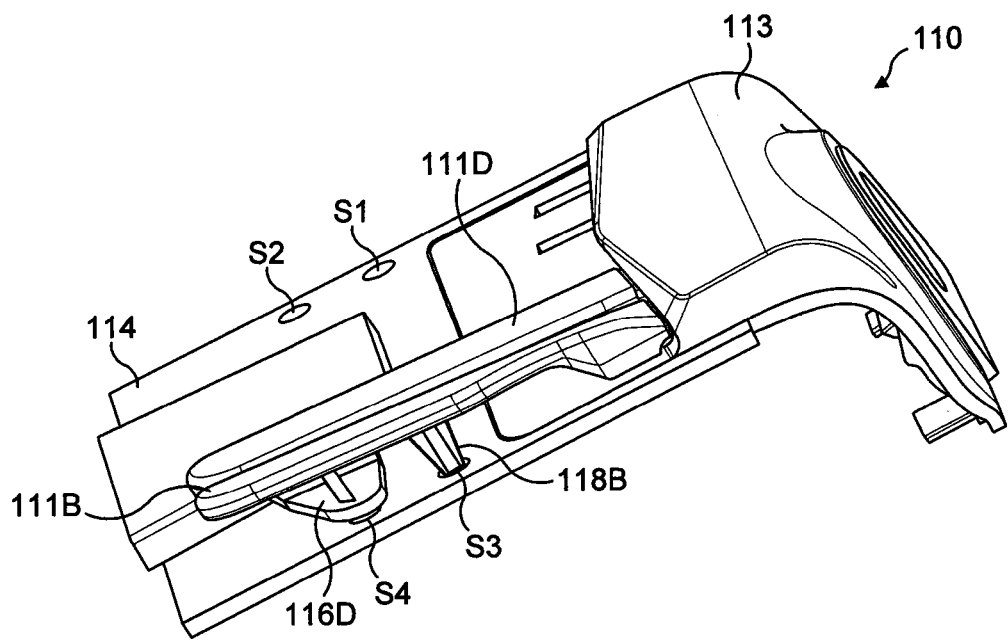
FIGS. 6A to 6D are perspective views of a portion of a rear panel of the games controller according to a second embodiment.
Figure 6B:
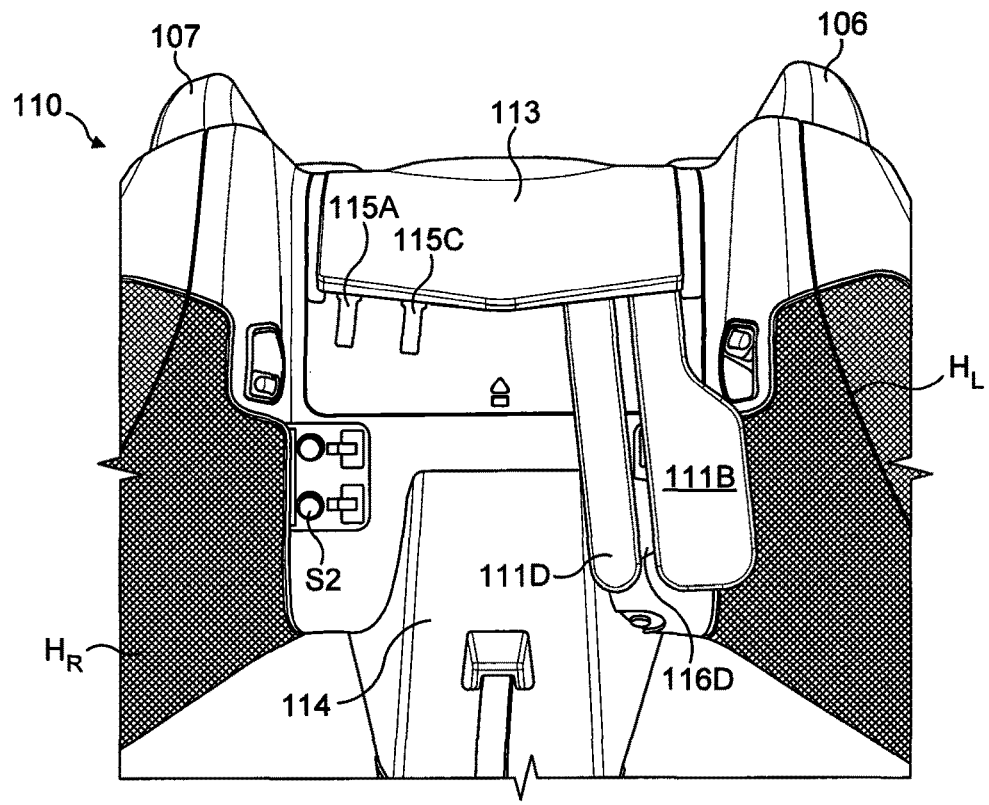
Figure 6C:
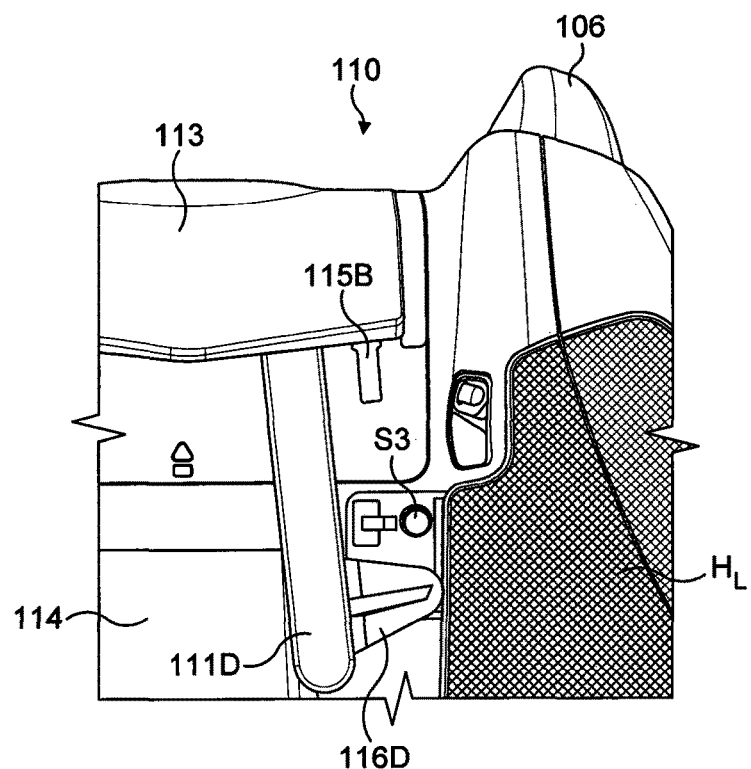
Figure 6D:
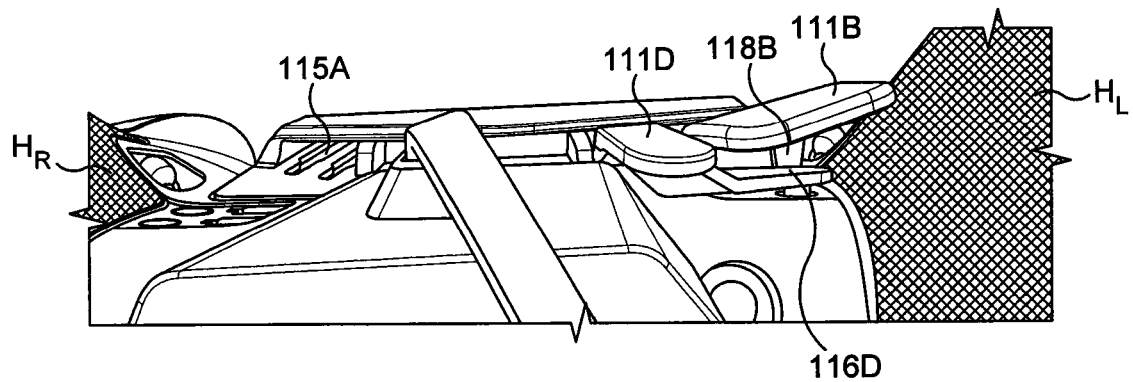

Referring now to FIGS. 6A to 6C, there is shown an additional embodiment of the present disclosure. In the second illustrated embodiment like numerals have, where possible, been used to denote like parts, albeit with the addition of the prefix "100" to indicate that these features belong to the second embodiment. The additional embodiment shares many common features with the first embodiment and therefore only the differences from the embodiment illustrated in FIGS. 1 to 5D will be described in detail.

In the embodiment of FIGS. 6A to 6D, the inner actuators, the third paddle lever (not shown) and fourth paddle lever 111D, are configured to activate the second and fourth switch mechanisms S2, S4. In order to do this the second wing 116D is disposed in closer proximity to the first end of the fourth paddle lever 111D than in the embodiment of FIGS. 1 to 5C, best shown in FIG. 6C.

The second wing 116D passes under the second paddle lever 111B as shown in FIGS. 6A, 6B and 6C.

Referring now to FIGS. 9A to 9D, there is shown an alternative embodiment. In the third illustrated embodiment like numerals have, where possible, been used to denote like parts, albeit with the addition of the prefix "200" to indicate that these features belong to the third embodiment respectively. The alternative embodiment shares many common features with the first and second embodiments and therefore only the differences from the embodiments illustrated in FIGS. 1 to 6C will be described in any greater detail.

In the embodiment of FIGS. 9A to 9D, the actuators 211B, 211D are detachably mounted to the hatch 213 by an alternative securing mechanism comprising a hook 230, and a guide or rail 232.

The paddle levers 211B, 211D comprise a first end and a second end. A region proximate the first end comprises a protuberance or boss 218B, 218D for engaging with a switch mechanism (not shown in FIG. 9A to 9D).

The third paddle lever 211B comprises a third boss 218B. The fourth paddle lever 211D comprises a fourth boss 218D; the fourth boss 218D is mounted to the inner surface of a second wing 216D which forms a lateral protrusion from the fourth paddle 211D. The second wing 216D extends under the second paddle lever 211B as shown in FIG. 9C. In this way the fourth paddle lever 211D is configured to activate a switch mechanism disposed in vertical registry with the second paddle lever 211B.

Figure 9A:
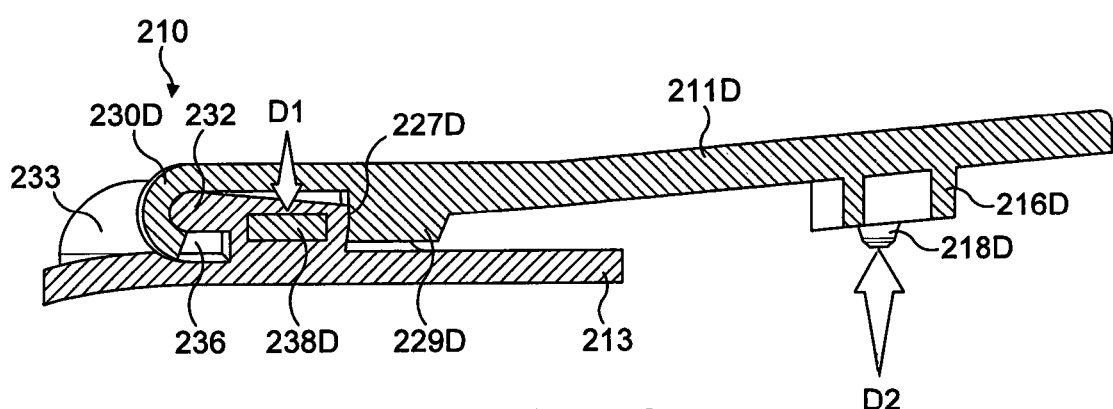
FIG. 9A is a sectional view of a portion of a rear panel of the games controller according to another embodiment showing a first alternative mounting arrangement for releasably coupling actuators to the games controller according to a third embodiment.

The second end of the second and fourth paddle levers 211B, 211D comprises the hook 230, best illustrated in FIG. 9A.

The rail 232 comprises an undercut 236 at a first end; the undercut 236 defines a channel. The undercut 236 is configured to receive at least in part a portion of the hook 232.

A second end of the rail 232 is configured to mate with a side wall 227D of an end stop 229D. The end stop 229D is formed by a projection extending from an inner surface of the paddle lever 211D.

Alternatively, the end stop 229D may be formed by a recess or cutaway in the paddle lever 211D provided on an inner surface thereof.

The second end of the rail 232 may comprise a second undercut and, for example, but not limited to, the second undercut may be arcuate or curved. The side wall 227D of the end stop 229D may be shaped complementarily to the second undercut and may be arranged such that the paddle lever 211D can be pivoted or rotated about the first end of the rail 232 whilst the side wall 227D of the end stop 229D and the second end of the rail are in close proximity or touching contact. In this way the surface of the side wall 227D of the end stop 229D may slide over the surface of the second end of the rail 232.

A permanent magnet 238A, 238C, 238D, for example but not limited to a neodymium magnet may be mounted in the rail 232. The magnet 238A, 238C, 238D may be arranged so as to be set into an upper surface of the rail 232; optionally the outer surface of the magnet 238A, 238C, 238D may be flush with the upper surface of the rail 232.

The paddle levers 211B, 211D may comprise a ferrous or other magnetic material such that the permanent magnets 238A, 238C, 238D hold the paddle lever 211B, 211D to the rail 232. In this way the rail 232 is disposed between the hook 230 and the end stop 229D, thus inhibiting or preventing unintentional separation of the paddle lever 211B, 211D from the rail 232.

In an alternative embodiment the paddle levers 211B, 211D may comprise a second permanent magnet arranged in polar opposition to the magnets 238A, 238C, 238D such that a force of attraction exists therebetween.

In yet other embodiments, the paddle levers 211B, 211D may comprise a permanent magnet and the rail 232 may comprise a ferrous or other magnetic material.

The paddle levers 211B, 211D may be arranged to as to be displaceable about rail 232 such that the hook 230 and the rail 232 form a hinged connection such that the paddle levers 211B, 211D can be pivoted or rotated about the rail 232. In the illustrated embodiment the upper surface of the rail 232 is inclined towards a first end thereof. In this way a void is provided between the paddle levers 211B, 211D and the rail 232 proximate the second end of the rail 232. The inner or lower surface of the end stop 229D is spaced apart from an outer surface of the hatch 213 disposed therebelow, thus providing a gap for the paddle lever 211B, 211D to rotate into. In other embodiments an elastically compressible material may be provided in the void between the paddle levers 211B, 211D and the rail 232 and/or in the gap between the end stop 229D and the outer surface of the hatch 213.

Lateral sides of the paddle levers may be supported by support members 231, 233, 235, 237, 239, 241. The support members 231, 233, 235, 237, 239, 241 comprise side walls which are disposed in close proximity to the lateral side edges of the paddle levers 211B, 211D so as to provide lateral support to the paddle levers 211B, 211D proximate the second ends thereof.

Figure 9B:
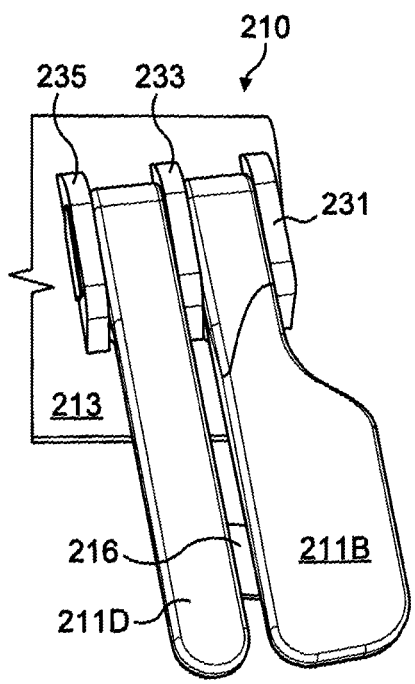
FIG. 9B is a perspective view from below of a portion of a rear panel of the games controller showing the second mounting arrangement of FIG. 9A.
Figure 9C:
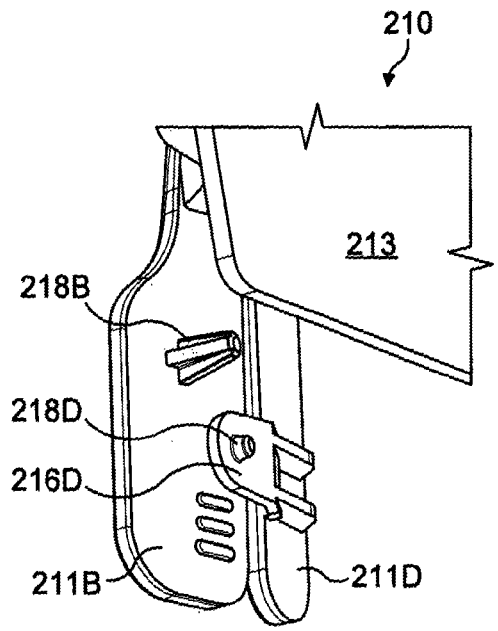
FIG. 9C is a perspective view from above of a portion of a rear panel of the games controller of FIG. 9A.
Figure 9D:
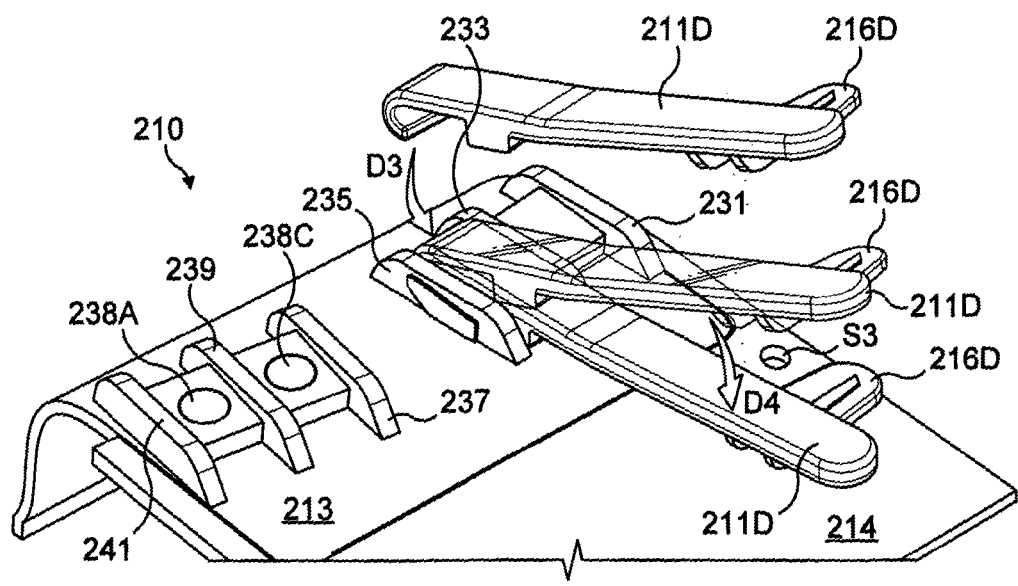
FIG. 9D is an alternative perspective view from below of a portion of a rear panel of the games controller of FIG. 9A.

In some embodiments a single support member 233, 239 may comprise a pair of opposing side walls, so as to provide lateral support to a pair of paddle levers 211B, 211D disposed on opposing sides of the support member 233, 239, as shown in FIG. 9B.

Figure 10A:
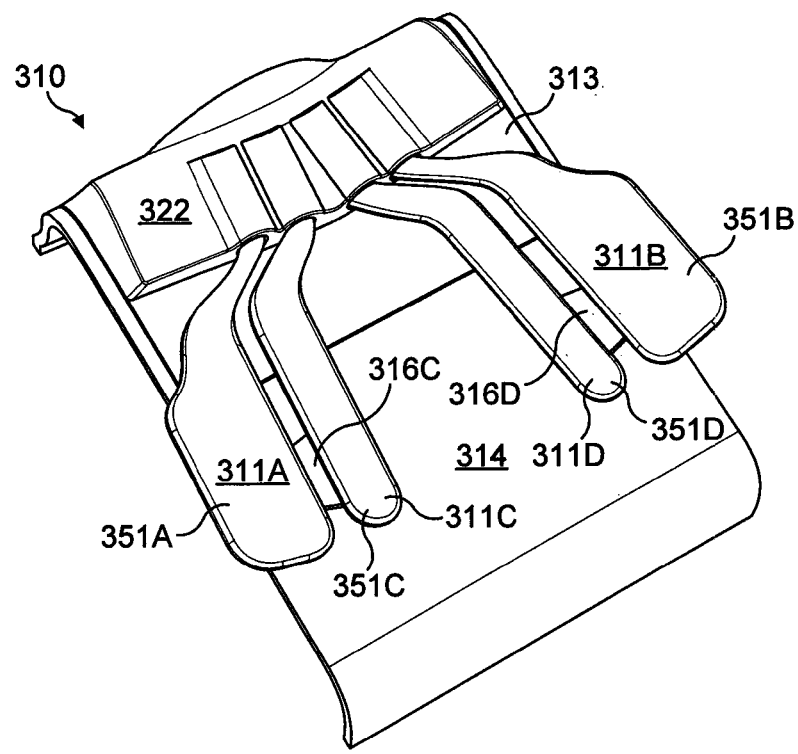
FIGS. 10A and 10B are perspective views from below of a portion of a rear panel of the games controller showing a third mounting arrangement for releasably coupling actuators to a games controller according to a fourth embodiment.
Figure 10B:
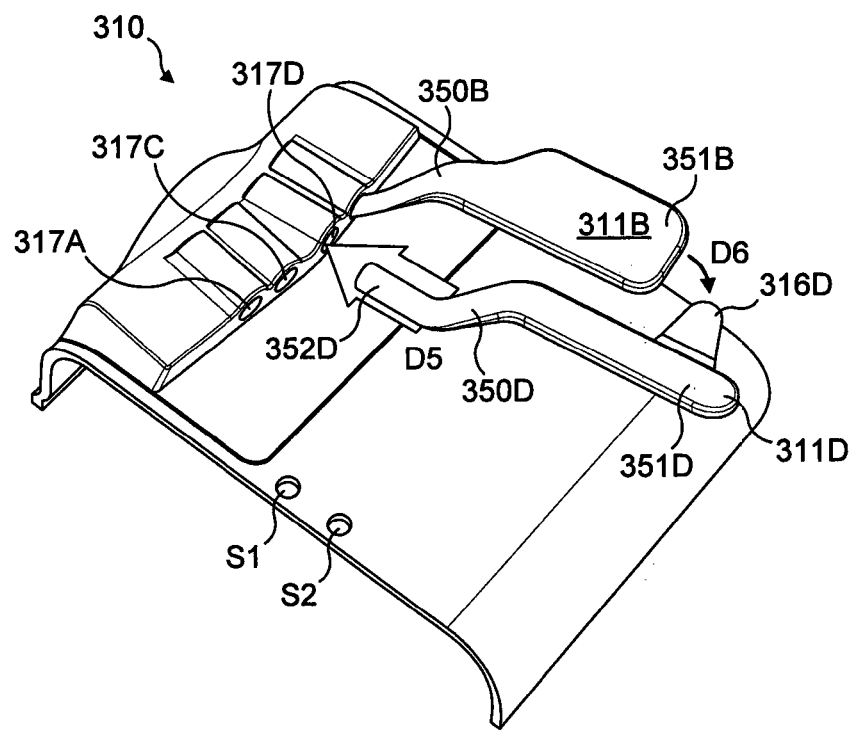
Figure 11:
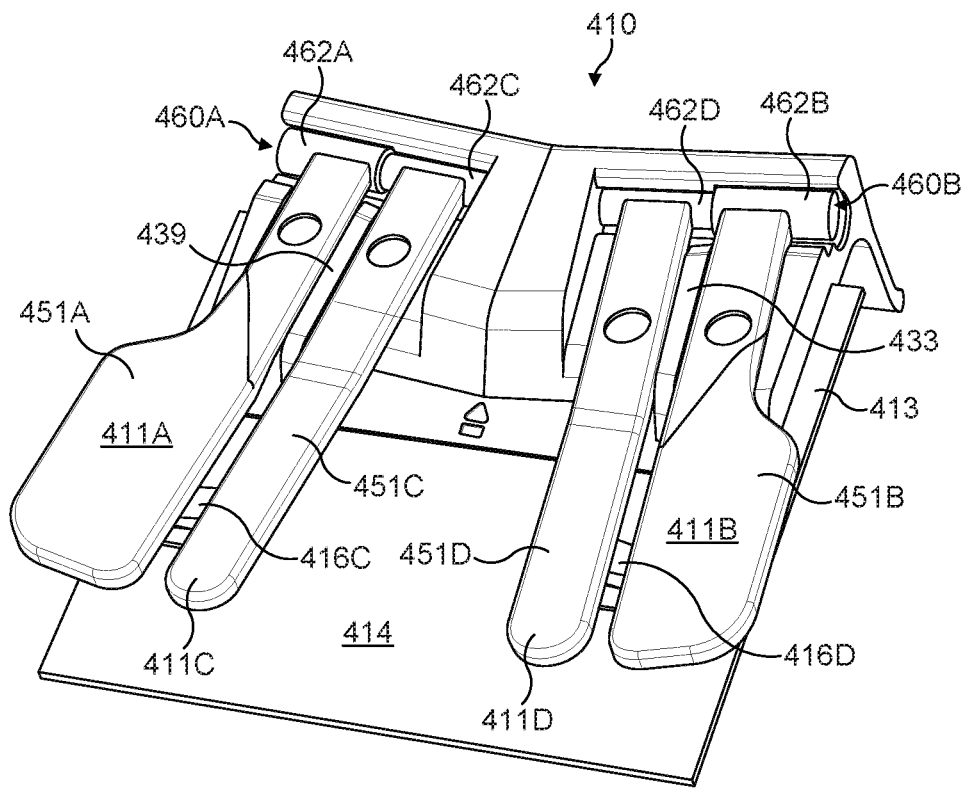
FIG. 11 is a perspective view from below of a portion of a rear panel of the games controller showing a fourth mounting arrangement for releasably coupling actuators to a games controller according to a fifth embodiment.

Referring now to FIGS. 10A and 10B, there is shown an alternative embodiment. In the fourth illustrated embodiment, like numerals have, where possible, been used to denote like parts, albeit with the addition of the prefix "300" to indicate that these features belong to the fourth embodiment respectively. The alternative embodiment shares many common features with the first, second and third embodiments and therefore only the differences from the embodiments illustrated in FIGS. 1 to 9D will be described in any greater detail.

FIGS. 10A and 10B illustrate a portion of the rear of a games controller 310 including yet another embodiment of a mounting arrangement for detachably coupling actuators to the controller 310. The controller 310 comprises four paddle levers 311A, 311B, 311C, 311D. A first paddle lever 311A is arranged to be disposed proximate a first handle (not shown) of the controller 310. A second paddle lever 311B is arranged to be disposed proximate a second handle (not shown) of the controller 310. A third paddle lever 311C is arranged to be disposed proximate the first paddle lever 311A. A fourth paddle lever 311D is arranged to be disposed proximate the second paddle lever 311B. Each paddle lever 311A, 311B, 311C, 311D comprises a head portion 352D (see FIG. 10B) at a first end. The head portion 352D takes the form of a shaft, optionally cylindrical in shape, which is configured to be received in a conduit 317A, 317C, 317D defining an internal bore which is complementary in shape to the shaft.

The head portion 352D is rotationally mounted within the conduit 317A, 317C, 317D.

The conduits 317A, 317C, 317D are mounted to, or integrally formed within, a hatch or detachable cover panel 313. In alternative embodiments the conduits 317A, 317C, 317D are mounted to, or integrally formed within, the controller body 314. Each conduit 317A, 317C, 317D comprises an open end through which a head portion 352D of the paddle levers 311A, 311B, 311C, 311D are inserted. An opposing end of each conduit 317A, 317C, 317D may be closed Each paddle lever 311A, 311B, 311C, 311D comprises a tail portion 351A, 351B, 351C, 351D (see FIG. 10B) at a second, opposing end thereof. The tail portion 351B, 351D is offset in a lateral direction from the head portion 352D. The tail portions 351B, 351D of the second and fourth paddle levers 311B, 311D are arranged so as to be disposed in closer proximity to the second handle of the controller 310 than the respective head portion 352D of said one of the second and fourth paddle levers 311B, 311D. The tail portions 351A, 351C of the first and third paddle levers 311A, 311C are arranged so as to be disposed in closer proximity to the first handle of the controller 310 than the respective head portion of said one of the first and third paddle levers 311A, 311C.

Each paddle lever 311A, 311B, 311C, 311D comprises an intermediate portion 350B, 350D (see FIG. 10B) extending between the head portion 352D and the tail portion. The intermediate portions 350A, 350B, 350C, 350D of each paddle lever 311A, 311B, 311C, 311D are divergently arranged with respect to the respective head portions of said paddle lever 311A, 311B, 311C, 311D. The intermediate portions 350A, 350B, 350C, 350D of each paddle lever 311A, 311B, 311C, 311D are divergently arranged with respect to the respective tail portion of said paddle levers 311A, 311B, 311C, 311D.

The intermediate portions 350B, 350D form a lever between the head portion 352D and the tail portion. This has the effect of increasing the radius of curvature of the arc through which the tail portions 351A, 351B, 351C, 351D rotate. The radius of curvature of the inner actuators 311C, 311D is smaller than the radius of curvature of the outer actuators 311A, 311B.

The third and fourth paddle levers 311C, 311D comprise a first wing 316C and a second wing 316D respectively. The first wing 316C extends from a lateral edge of the tail portion 351C of the third paddle lever 311C below the tail portion 351A of the first paddle lever 311A. The first wing 316C is arranged to activate a switch mechanism S1, S2 disposed in vertical registry with the tail portion 351A of the first paddle lever 311A.

The second wing 316D extends from a lateral edge of the tail portion 351D of the fourth paddle lever 311D below the tail portion 351B of the second paddle lever 311B. The second wing 316D is arranged to activate a switch mechanism disposed in vertical registry with the tail portion 351B of the second paddle lever 311B.

The head portion 352D of each paddle lever 311A, 311B, 311C, 311D may be held within the respective one of the conduits 317A, 317C, 317D and have a magnet disposed therein. A magnet may be rotationally mounted within each conduit 317A, 317C, 317D.

Each conduit 317A, 317C, 317D may comprise a retainer for securing the magnet within the conduit 317A, 317C, 317D. In this way the magnet is retained within the conduit 317A, 317C, 317D when the paddle lever 311A, 311B, 311C, 311D is withdrawn or removed. The retainer may also prevent the magnet from unintentionally exiting the conduit 317A, 317C, 317D when the conduit 317A, 317C, 317D is empty—that is to say when no paddle lever 311A, 311B, 311C, 311D is present therein.

The retainer may take the form of a retainer wall formed within the conduit 317A, 317C, 317D, the magnet having a larger diameter than the head portion 352D and the retainer wall having an annular cross sectional shape such that the head portion 352D can pass through an aperture in the retainer wall so as to be brought into contact with the magnet disposed on the opposing side of the retainer wall.

The retainer wall may, in some embodiments, be formed as a sleeve or tubular insert which is inserted into the conduit 317A, 317C, 317D after the magnet has been inserted. The sleeve may comprise a bayonet type fixing preventing or inhibiting its removal and hence also the removal of the magnet. In some embodiments the sleeve may form a bearing or bushing between the head portion 352D and the conduit 317A, 317C, 317D.

In still other embodiments the sleeve and magnet may be integrally formed or coupled together so as to be inserted together. The bayonet fixing may be arranged so as to allow rotational movement of the sleeve or magnet but to inhibit or prevent linear translation along the tubular axis of the conduit 317A, 317C, 317D. The bayonet fixing may be arranged to allow full rotation through 360 degrees or may comprise end stops limiting the angular range of motion. For example the bayonet fixing may comprise a barb or detent which is receivable in a circumferentially arranged rebate or trough in the inner wall or surface of the conduit 317A, 317C, 317D. The rebate or trough may extend fully around the inner wall of the conduit 317A, 317C, 317D thereby allowing full 360 degree rotation, or may extend only partially around the inner wall of the conduit 317A, 317C, 317D thereby limiting the range of rotational movement, the ends of the rebate or trough defining end stops to the range of rotational movement.

In alternative embodiments the paddle levers 311A, 311B, 311C, 311D may be retained in the conduits 317A, 317C, 317D by a mechanical fastener. For example, the head portion 352D of the paddle levers 311A, 311B, 311C, 311D may comprise a circumferentially arranged rebate or trough in the outer surface thereof. The rebate or trough may extend fully around the outer surface of the head portion 352D thereby allowing full 360 degree rotation, or may extend only partially around the outer surface of the head portion 352D thereby limiting the range of rotational movement, the ends of the rebate or trough defining end stops to the range of rotational movement.

Each conduit 317A, 317C, 317D may comprise an aperture extending through the wall of the conduit 317A, 317C, 317D. The aperture may comprise an internal thread configured to receive an external thread of a screw such as, but not limited to, a grub screw. The aperture is configured such that an end of the screw may pass through the wall of the conduit 317A, 317C, 317D and be received in the rebate or trough in the outer surface of the head portion 352D. In this way when the screw is received in the rebate or trough in the outer surface of the head portion 352D of the paddle lever 311A, 311B, 311C, 311D is prevented or at least inhibited from linear movement in the direction of the tubular axis of the conduit 317A, 317C, 317D.

The paddle levers 311A, 311B, 311C, 311D may be removed from the conduits 317A, 317C, 317D by unscrewing the screw so as to withdraw the screw sufficiently that it clears the rebate or trough in the outer surface of the head portion 352D of the paddle lever 311A, 311B, 311C, 311D.

In alternative embodiments the head portion 352D of the paddle levers 311A, 311B, 311C, 311D may be arranged to have a first region proximate the first end which comprises a larger diameter than an adjacent second region so as to define an annular wall about the head portion 352D of the paddle lever 311A, 311B, 311C, 311D. The annular wall interacts with the screw to retain the paddle lever 311A, 311B, 311C, 311D within the conduit 317A, 317C, 317D. The paddle levers 311A, 311B, 311C, 311D may be removed from the conduits 317A, 317C, 317D by unscrewing the screw so as to withdraw the screw sufficiently that it clears the outer surface of the first region of the paddle lever 311A, 311B, 311C, 311D.

Referring now to FIGS. 11 to 14B, there is shown an alternative embodiment. In the fifth illustrated embodiment like numerals have, where possible, been used to denote like parts, albeit with the addition of the prefix "400" to indicate that these features belong to the fifth embodiment respectively. The alternative embodiments share many common features with the first, second, third and fourth embodiments and therefore only the differences from the embodiment illustrated in FIGS. 1 to 10B will be described in any greater detail.

FIGS. 11 to 14B illustrate a portion of the rear of a games controller 410 including yet another embodiment of a mounting arrangement for detachably coupling actuators to the controller 410. The controller 410 comprises four actuators: a first paddle lever 411A, a second paddle lever 411B, a third paddle lever 411C and a fourth paddle lever 411D, mounted on the rear of the controller 410.

The third and fourth paddle levers 411C, 411D comprise a first wing 416C and a second wing 416D respectively.

The first wing 416C extends from a lateral edge of the tail portion 451C of the third paddle lever 411C below the tail portion 451A of the first paddle lever 411A. The first wing 416C is arranged to activate one of a pair of switch mechanisms S1, S2 disposed in vertical registry with the tail portion 451A of the first paddle lever 411A.

The second wing 416D extends from a lateral edge of the tail portion 451D of the fourth paddle lever 411D below the tail portion 451B of the second paddle lever 411B. The second wing 416D is arranged to activate one of a pair of switch mechanisms S3, S4 disposed in vertical registry with the tail portion 451B of the second paddle lever 411B.

Each paddle lever 411A, 411B, 411C, 411D comprises a substantially cylindrical end portion at a first end of a main body of the paddle lever 411A, 411B, 411C, 411D. The cylindrical end portion 462A, 462B, 462C, 462D forms a trunnion, which enables the paddle levers 411A, 411B, 411C, 411D to be mounted on the controller 410, and operates as a pivot point about which the paddle levers 411A, 411B, 411C, 411D may be rotated.

The controller 410 comprises a body portion 414 and a cover panel or hatch 413. The hatch 413 may be detachably mounted to the body portion 414.

The hatch 413 comprises a first part of a complementary securing mechanism. In alternative embodiments the first part of a complementary securing mechanism may be mounted to, or integrally formed with, the body portion 414.

Figure 13A:
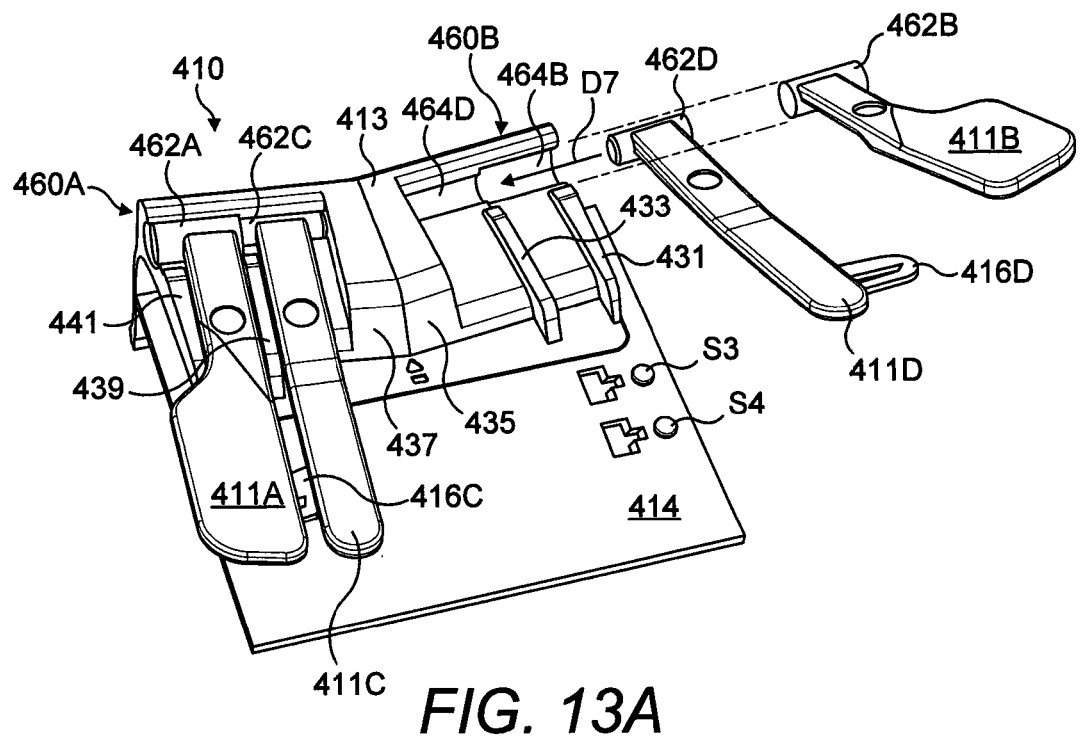
Figure 13B:
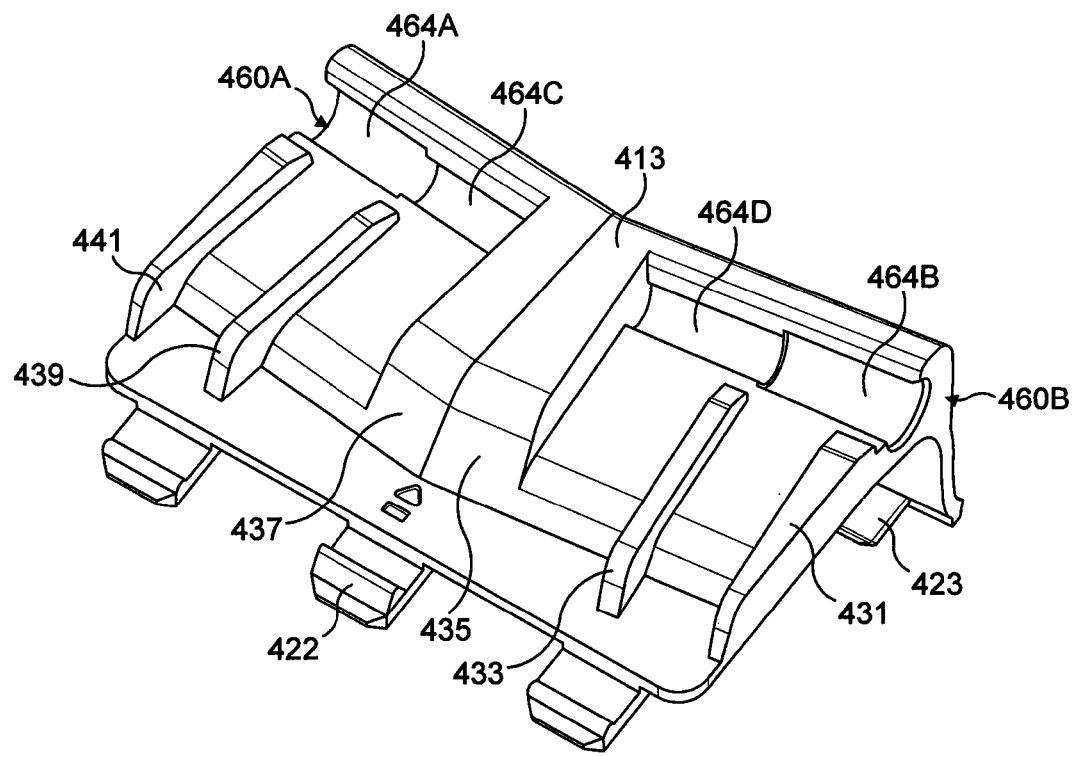

The hatch 413, best illustrated in FIG. 13B, comprises a first trough or channel 460A and a second trough or channel 460B. The first channel 460A is separated from the second channel 460B by an upstand defining a first end wall 437 and a second end wall 435. The first end wall 437 closes an end of the first channel 460A. The second end wall 435 closes an end of the second channel 460B.

Optionally, the first channel 460A is arranged divergently with respect to the second channel 460B.

The first channel 460A and the second channel 460B are arranged to be complementary in shape to the cylindrical end portion 462A, 462B, 462C, 462D of the paddle levers 411A, 411B, 411C, 411D. The first and second channels 460A, 460B can be considered to define a circular bore having a longitudinal cutaway therealong—a partial cylinder—the longitudinal cutaway taking the form of a slot.

The first and second channels 460A, 460B provide a cradle or receiver in which the cylindrical end portion 462A, 462B, 462C, 462D of the paddle levers 411A, 411B, 411C, 411D are received. The first and second channels 460A, 460B are arranged such that the paddle levers 411A, 411B, 411C, 411D cannot be withdrawn through the longitudinal cutaway. The first and second channels 460A, 460B extend greater than 50% about the circumference of the cylindrical end portions 462A, 462B, 462C, 462D.

The width dimension of the longitudinal cutaway is less than the maximum width dimension or diameter of the cylindrical end portions 462A, 462B, 462C, 462D.

The main body of each paddle lever 411A, 411B, 411C, 411D extends through the longitudinal cutaway in the first and second channels 460A, 460B.

The first channel 460A comprises a first channel portion 464A having a first bore dimension or diameter and a third channel portion 464C having a third bore dimension or diameter.

Optionally, the third portion 462C of the first channel 460A is smaller in dimension or diameter in a transverse direction than the first portion 462A of the first channel 460A.

The second channel 460B comprises a second channel portion 464B having a second bore dimension or diameter and a fourth channel portion 464D having a fourth bore dimension or diameter.

Optionally, the fourth channel portion 464D of the second channel 460B is smaller in dimension or diameter in a transverse direction than the second channel portion 464B of the second channel 460B.

As illustrated in FIGS. 12B, 13B, 14A and 14B the cylindrical end portions 462A, 462B, 462C, 462D are inserted into the first or second channel 460A, 460B by inserting through the open end of the first or second channel 460A, 460B.

In the illustrated embodiment the cylindrical end portions 462C, 462D of the third and fourth paddle levers 411C, 411D are smaller in diameter than the cylindrical end portions 462A, 462B of the first and second paddle levers 411A, 411B. The third and fourth channel portions 464C, 464D are sized to closely fit the cylindrical end portions 462C, 462D of the third and fourth paddle levers 411C, 411D. The first and second channel portions 462A, 462B are sized to closely fit the cylindrical end portions 464A, 464B of the first and second paddle levers 411A, 411B. In this way the first and second paddle levers 411A, 411B cannot be inserted into the respective one of the third and fourth channel portions 464C, 464D.

The third paddle lever 411C is inserted through the open end of the first channel 460A prior to insertion of the first paddle lever 411A. The fourth paddle lever 411D is inserted through the open end of the second channel 460B prior to insertion of the second paddle lever 411B as shown in FIG. 13A.

The hatch 413 comprises a first side wall 441, second side wall 431, third side wall 439 and fourth side wall 433.

The first side wall 441 provides a first retainer which prevents or inhibits movement of the first paddle lever 411A towards the open end of the first channel 460B. In this way the first retainer prevents or inhibits the first paddle lever 411A from exiting the first channel 460A.

The second side wall 431 provides a second retainer which prevents or inhibits movement of the second paddle lever 411B towards the open end of the second channel 460B. In this way the second retainer prevents or inhibits the second paddle lever 411B from exiting the second channel 460B.

The third side wall 439 provides a third retainer which prevents or inhibits movement of the third paddle lever 411C towards the open end of the first channel 460A. In this way the third retainer retains the third paddle lever 411C in position in the third channel portion 464C of the first channel 460A.

The fourth side wall 433 provides a fourth retainer which prevents or inhibits movement of the fourth paddle lever 411D towards the open end of the second channel 460B. In this way the fourth retainer retains the fourth paddle lever 411D in position in the fourth channel portion 464D of the second channel 460B.

The first, second, third and fourth side walls 441, 431, 439, 433 may also provide lateral support to the paddle levers 411A, 411B, 411C, 411D and serve as a brace or support member.

Figure 12A:
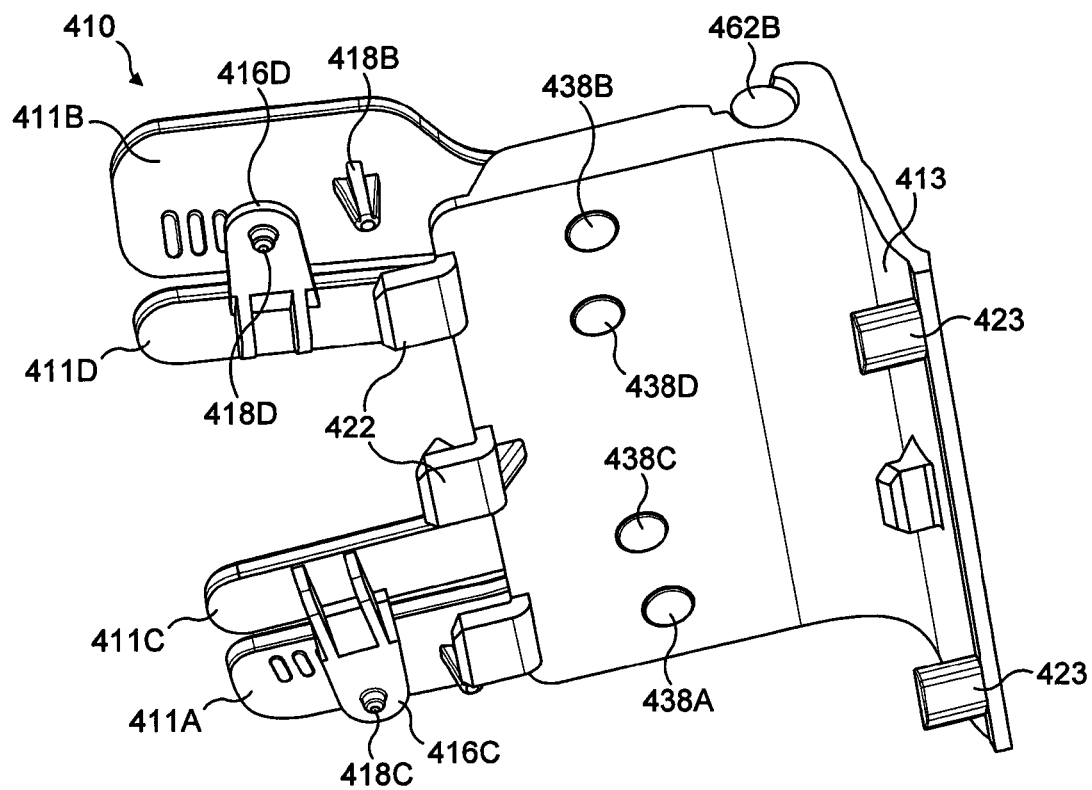
FIGS. 12A to 12C, 13A to 13B and 14A to 14B are alternative views of the portion of a rear panel of the games of FIG. 11.
Figure 12B:
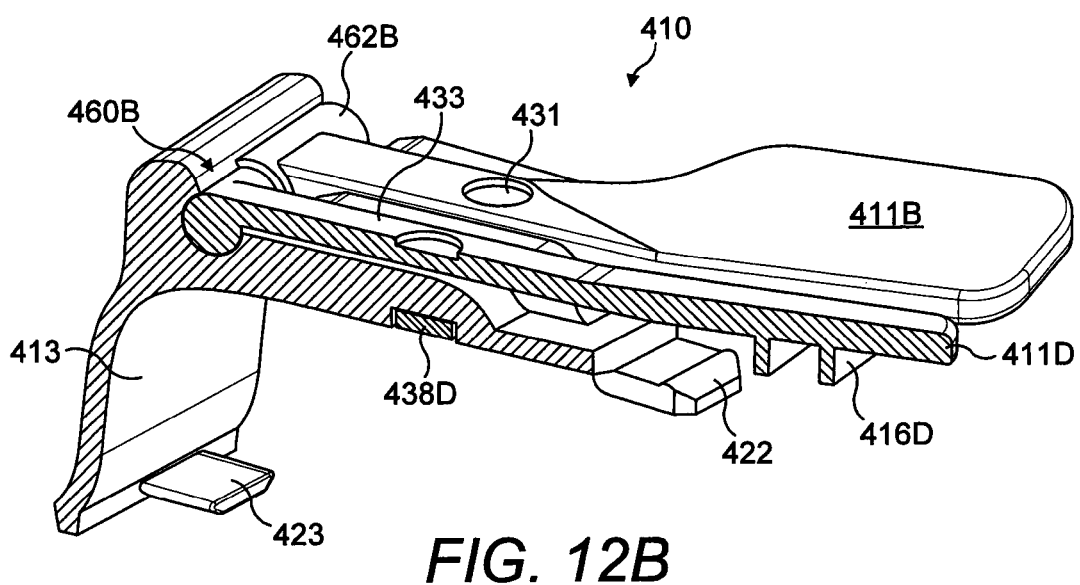

The hatch 413 comprises a plurality of magnets 438A, 438B, 438C, 438D such as, but not limited to, permanent magnets. A magnet 438A, 438B, 438C, 438D is located in vertical registry with each of the paddle levers 411A, 411B, 411C, 411D as shown in FIGS. 12A and 12B. The paddle levers 411A, 411B, 411C, 411D comprise a ferrous or magnetic material.

The magnets 438A, 438B, 438C, 438D pull or attract the paddle levers 411A, 411B, 411C, 411D towards the hatch 413.

The magnets 438A, 438B, 438C, 438D may hold the paddle levers 411A, 411B, 411C, 411D to the hatch 413.

In this way the magnets 438A, 438B, 438C, 438D inhibit rotation of the paddle levers 411A, 411B, 411C, 411D away from the outer surface of the hatch 413.

Figure 14A:
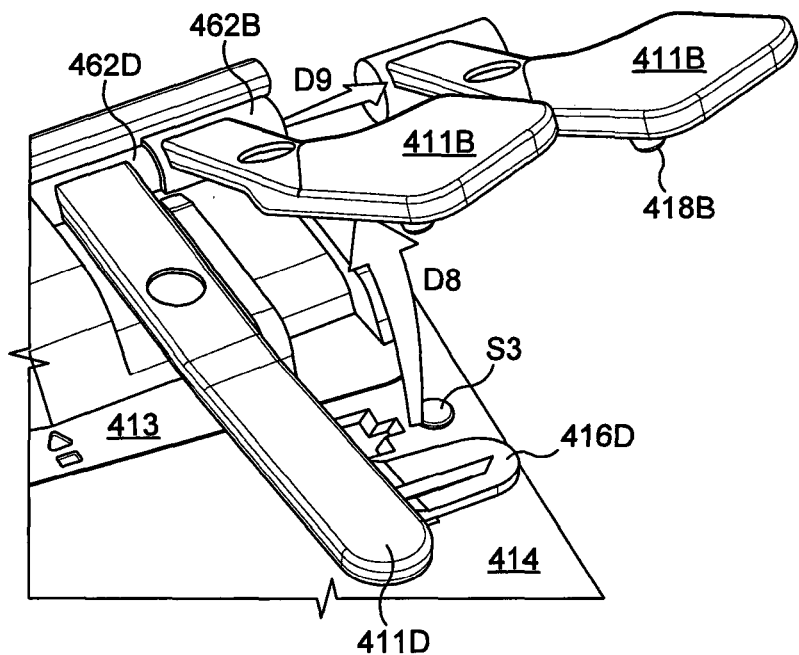
Figure 14B:
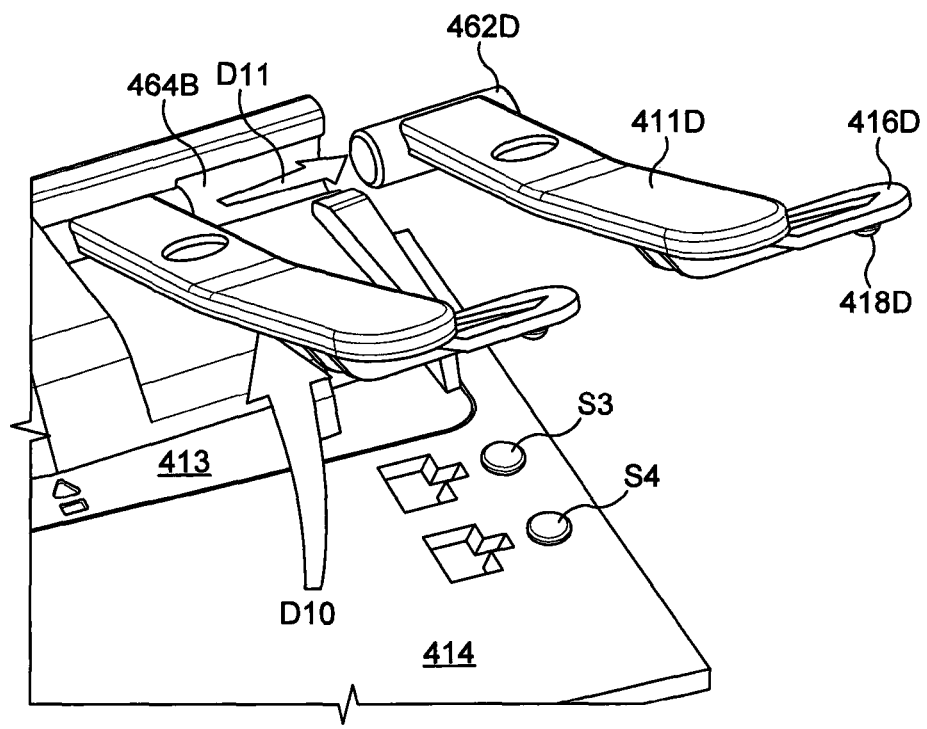

In order to remove the paddle levers 411A, 411B, 411C, 411D a user must overcome the force of attraction to rotate the paddle levers 411A, 411B, 411C, 411D away from the outer surface of the hatch 413 as indicated by direction arrows D8 and D10 in FIGS. 14A, 14B.

As shown in FIG. 14A once the second paddle lever 411B clears the second side wall 431 the second paddle lever 411B can be translated along the second channel 460B out of the open end.

Once the second paddle lever 411B has been removed, the fourth paddle lever 411D can be removed. The fourth paddle lever 411D is rotated away from the outer surface of the hatch 413 as indicated by direction arrow D10 until the main body of the fourth paddle lever 411D clears the fourth side wall 433. The fourth paddle lever 411D can be translated along the second channel 460B and removed through the open end.

It will be appreciated that the second and fourth paddle levers 411B, 411D may be removed simultaneously. The second wing 416D may facilitate simultaneous removal of the second and fourth paddle levers 411B, 411D since the user may engage with the fourth paddle lever 411D. When the fourth paddle lever 411D is rotated, the second wing 416D will engage with an inner surface of the second paddle lever 411B and hence will cause the second paddle lever 411B to be rotated together with the fourth paddle lever 411D.

Figure 18:
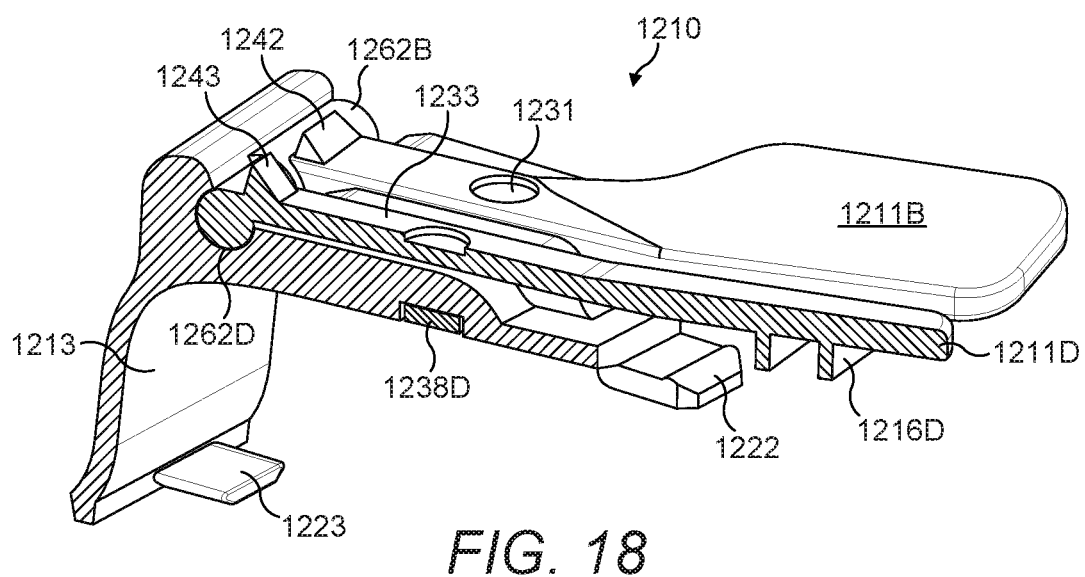
FIG. 18 is a sectional view of a portion of a rear panel of the games controller showing the fourth mounting arrangement of FIG. 11 in which the actuator comprise a restrictor for restricting the angular range of motion.

FIG. 18 illustrates a portion of a rear panel of the games controller showing an alternative embodiment in which the mounting arrangement comprises a restrictor for restricting the angular range of motion. In the thirteenth illustrated embodiment like numerals have, where possible, been used to denote like parts, albeit with the addition of the prefix "1200" to indicate that these features belong to the thirteenth embodiment respectively. The alternative embodiment shares many common features with the fifth embodiment and therefore only the differences from the embodiment illustrated in FIGS. 11 to 14B will be described in any greater detail.

In the illustrated embodiment the actuators comprise a restrictor. The second paddle lever 1211B comprises a second restrictor 1242 and the fourth paddle lever 1211D comprises a fourth restrictor 1243. The second and fourth restrictors 1242, 1243 take the form of a projection or boss on an upper surface of the main body of the respective one of the second and fourth paddle levers 1211B, 1211D. The second and fourth restrictors 1242, 1243 are disposed proximate the cylindrical end portions 1262A, 1262B of second and fourth paddle levers 1211B, 1211D respectively.

In alternative embodiments the hatch 1213 may, in addition to or alternatively to, the actuators, comprise a restrictor; a projection or boss may extend from the wall of the first or second channel 1260B, 1260B to extend at least partially over the cylindrical end portion 1262B, 1262D thereby limiting the range of angular motion.

Figure 12C:
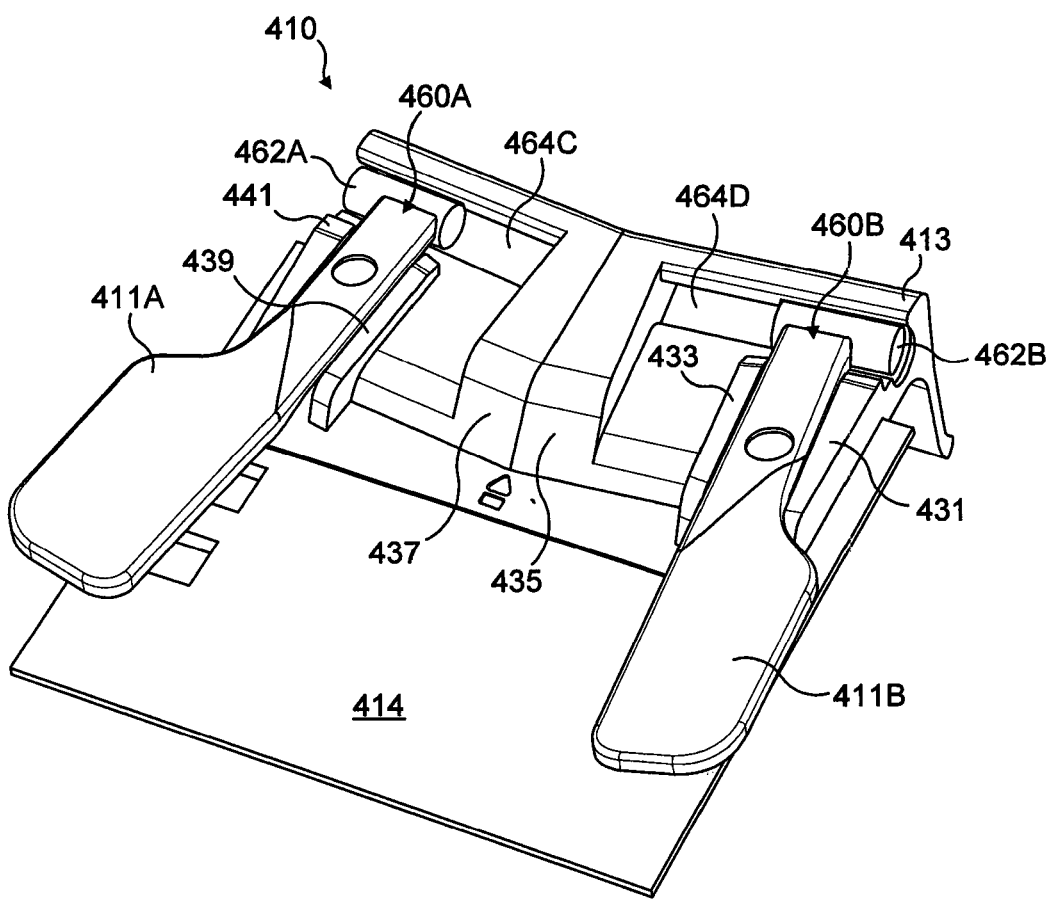

FIG. 12C illustrates the hatch 413 in which the inner actuators, third and fourth paddle levers 411C, 411D are omitted or removed. The first paddle lever 411A may be employed to activate one of a first pair of switch mechanisms S1, S2 disposed in vertical registry with the tail portion 451A of the first paddle lever 411A. The second paddle lever 411B may be employed to activate one of a second pair of switch mechanisms S3, S4 disposed in vertical registry with the tail portion 451B of the second paddle lever 411B.

Figure 15A:
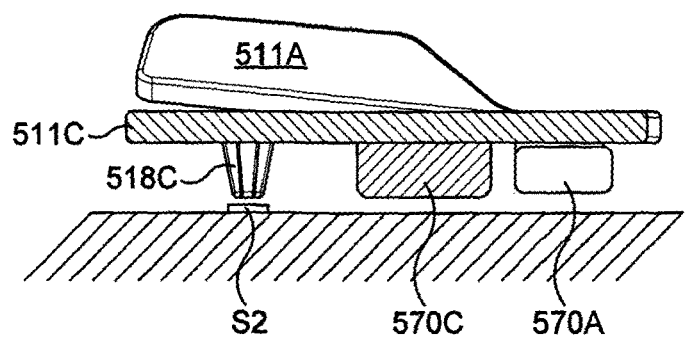
FIG. 15A is a perspective view from below of a portion of a rear panel of the games controller showing a fifth mounting arrangement for releasably coupling actuators to a games controller according to a sixth embodiment.
Figure 15B:
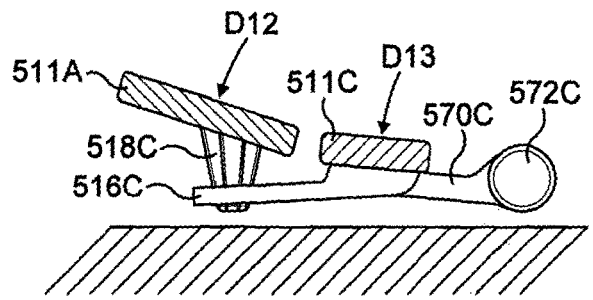
FIGS. 15B and 15C are sectional views of a fifth mounting arrangement of FIG. 15A.
Figure 15C:
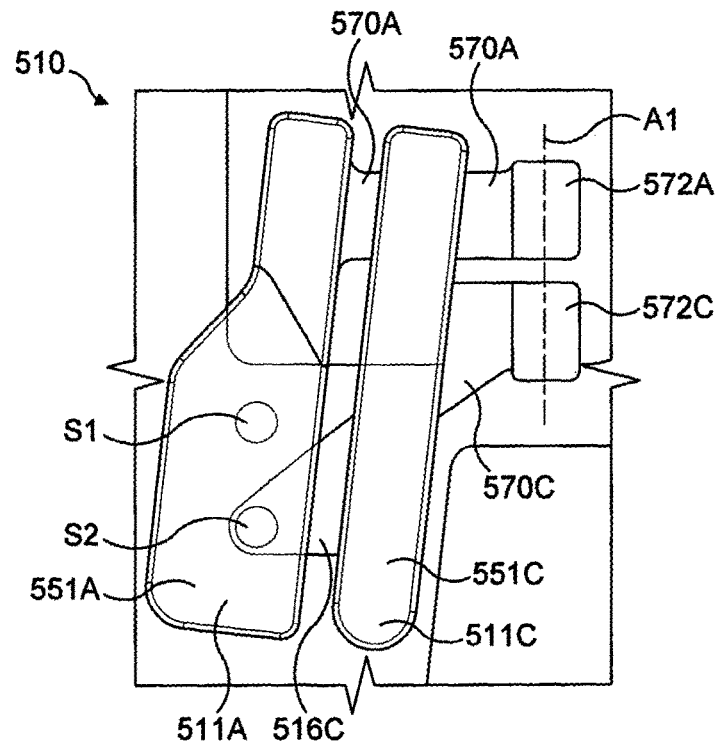

Referring now to FIGS. 15A to 17C, there are shown alternative embodiments. In the illustrated embodiments like numerals have, where possible, been used to denote like parts, albeit with the addition of the prefix "500", "600", "700", "800", "900", "1000", "1100" to indicate that these features belong to the sixth, seventh, eighth, ninth, tenth, eleventh and twelfth embodiments respectively. The alternative embodiments share many common features with the previous embodiments and therefore only the differences from the embodiments illustrated in FIGS. 1 to 14B will be described in any greater detail:

FIGS. 15A to 15C illustrate a portion of the rear of a games controller 510 including a sixth embodiment of a mounting arrangement for detachably coupling actuators to the controller 510. The controller 510 comprises four actuators: a first paddle lever 511A, a second paddle lever 511B (not shown), a third paddle lever 511C and a fourth paddle lever 511D (not shown), mounted on the rear of the controller 510.

The mounting arrangement will be described with reference to the first and third paddle levers 511A, 511C. It will be understood that a similar, albeit mirror image, mounting arrangement is provided for coupling the second and fourth paddle levers 511B, 511D to the controller 510.

The third paddle lever 511C comprises a first wing 516C (shown in FIGS. 15B and 15C) and the fourth paddle lever 511D comprises a second wing (not shown).

The first wing 516C extends from a first lateral edge of the tail portion 551C of the third paddle lever 511C below the tail portion 551A of the first paddle lever 511A. The first wing 516C is arranged to activate one of a pair of switch mechanisms S1, S2 disposed in vertical registry with the tail portion 551A of the first paddle lever 511A.

The first and third paddle levers 511A, 511C are pivotally coupled to the rear of a controller 510, for example employing a trunnion in a cradle as described with reference to the fifth embodiment of FIGS. 11 to 14B.

The first and third paddle levers 511A, 511C pivot about an axis A1 which extends substantially between the top and bottom of the controller 510.

The first paddle lever 511A comprises a first portion 572A which is pivotally mounted to the controller 510. The first paddle lever 511A comprises a second portion 551A which is laterally spaced apart from and coupled to the first portion 572A by an intermediate portion 570A. The second portion 551A is divergently arranged with respect to the intermediate portion 570A. The second portion 551A extends substantially longitudinally with respect to the controller 510; that is to say, substantially in a direction extending between the top and bottom of the controller 510. The intermediate portion 570A extends substantially transversely with respect to the controller 510; that is to say, substantially in a direction extending between the opposed sides (in the embodiment of FIG. 3, the opposed sides are defined by the first and second handle $H_R$, $H_L$) of the controller 510. The intermediate portion 570A extends substantially from a first end of the first portion 551A. The first end of the first portion 551A is disposed in closer proximity to the top of the controller 510 than a second opposing end of the first portion 551A.

The third paddle lever 511C comprises a first portion 572C which is pivotally mounted to the controller 510. The third paddle lever 511C comprises second portion 551C which is laterally spaced apart from and coupled to the first portion 572C by an intermediate portion 570C. The second portion 551C is divergently arranged with respect to the intermediate portion 570C. The second portion 551C extends substantially longitudinally with respect to the controller 510; that is to say, substantially in a direction extending between the top and bottom of the controller 510. The intermediate portion 570C extends substantially transversely with respect to the controller 510; that is to say, substantially in a direction extending between the opposed sides (in the embodiment of FIG. 3, the opposed sides are defined by the first and second handles $H_R$, $H_L$) of the controller 510. The intermediate portion 570A extends substantially from a second lateral or side edge. The intermediate portion 570A is coupled to the first portion 551A at a location intermediate a first end of the first portion 551A and a second end of the first portion 551A. The first end of the first portion 551A is disposed in closer proximity to the top of the controller 510 than a second opposing end of the first portion 551A. The first end of the first portion 551A is configured to extend in overlapping relationship with a portion of the intermediate portion of the first paddle lever 511A as illustrated in FIGS. 15A and 15C.

Figure 16A:
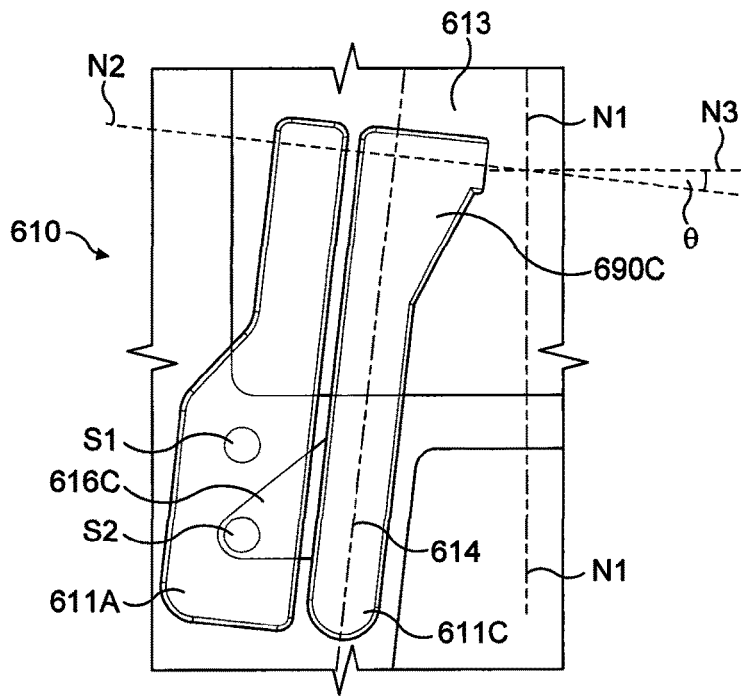
FIG. 16A is a perspective view from below of a portion of a rear panel of the games controller showing a sixth mounting arrangement for releasably coupling actuators to a games controller according to a seventh embodiment.

FIG. 16A illustrates a portion of the rear of a games controller 610 including a seventh embodiment of a mounting arrangement for detachably coupling actuators to the controller 610. The controller 610 comprises four actuators: a first paddle lever 611A, a second paddle lever (not shown), a third paddle lever 611C and a fourth paddle lever (not shown), mounted on the rear of the controller 610.

The mounting arrangement will be described with reference to the first and third paddle levers 611A, 611C. It will be understood that a similar, albeit mirror image, mounting arrangement is provided for coupling the second and fourth paddle levers (not shown) to the controller 610.

The third paddle lever 611C comprises a first wing 616C and the fourth paddle lever (not shown) comprises a second wing (not shown).

The first wing 616C extends from a first lateral edge of the tail portion 651C of the third paddle lever 611C below the tail portion 651A of the first paddle lever 611A. The first wing 616C is arranged to activate one of a pair of switch mechanisms S1, S2 disposed in vertical registry with the tail portion 651A of the first paddle lever 611A.

The first and third paddle levers 611A, 611C are pivotally coupled to the rear of a controller 610, for example employing a trunnion in a cradle as described with reference to the fifth embodiment of FIGS. 11 to 14B.

Each of the first and third paddle levers 611A, 611C pivot about an axis indicated by dashed line N2. The pivotal axis is orientated at a non-zero angle with respect to a longitudinal direction of the controller 610. The longitudinal direction is indicated by dashed line N1 and extends substantially between the top and bottom of the controller 610. In the illustrated embodiment, the pivotal axis is arranged to define a non-zero angle θ with respect to a transverse direction of the controller 610. The transverse direction is indicated by dashed line N3 and extends substantially between the opposed sides of the controller 610.

The third paddle lever 611C may be tapered in shape such that the third paddle lever 611C widens towards a first end at which the third paddle lever 611C is pivotally coupled to the controller 610. The tapered portion 690C of the third paddle lever 611C may prevent or reduce the likelihood of the third paddle lever 611C twisting along its length when operated. It also provides increased strength to the third paddle lever 611C to withstand torsional forces during operation.

Figure 16B:
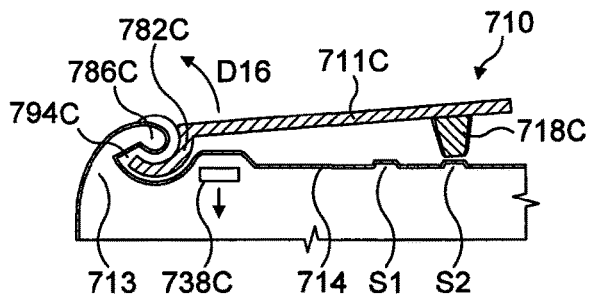
FIG. 16B is a sectional view of a seventh mounting arrangement for releasably coupling actuators to a games controller according to an eighth embodiment.

FIG. 16B illustrates a sectional view of the rear of a games controller 710 according to an eighth embodiment of a mounting arrangement for detachably coupling actuators to the controller 710. The controller 710 comprises four actuators a first paddle lever (not shown), a second paddle lever (not shown), a third paddle lever 711C and a fourth paddle lever (not shown), mounted on the rear of the controller 710.

In the embodiment of FIG. 16B, the actuators 711C are detachably mounted to the controller 710 by an alternative securing mechanism comprising a hook 782C and a channel 784C. The hook 782C has been inverted with respect to the hook 230 of the embodiment shown in FIG. 9A. The controller 710 comprise a complementarily shaped channel 784C mounted to the body 714 of the controller 710. The channel 784C is defined at least in part by an upper wall which extends over the hook 7820, the upper wall comprises a head portion 786C which extends into the hook 782C. The third paddle lever 711C is held in place by a magnet 738A disposed in vertical registry with the third paddle lever 711C.

Figure 16C:
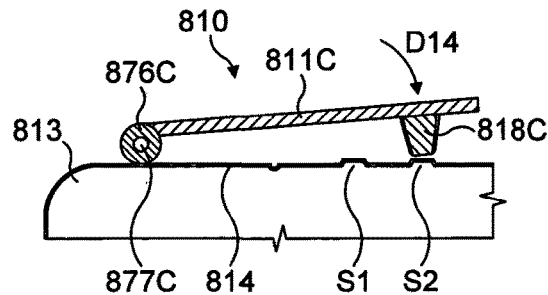
FIG. 16C is a sectional view of an eighth mounting arrangement for releasably coupling actuators to a games controller according to a ninth embodiment.

FIG. 16C illustrates a sectional view of the rear of a games controller 810 according to a ninth embodiment of a mounting arrangement for detachably coupling actuators to the controller 810. The controller 810 comprises four actuators a first paddle lever (not shown), a second paddle lever (not shown), a third paddle lever 811C and a fourth paddle lever (not shown), mounted on the rear of the controller 810.

In the embodiment of FIG. 16C, the actuators 811C are detachably mounted to the controller 810 by an alternative securing mechanism comprising a loop 876C and a pin 877C. The loop 876C is provided at a first end of the third paddle lever 811C. The controller 810 comprises a pin 877C mounted to the body 814 of the controller 810. The third paddle lever 811C is slid on to the pin 877C such that the pin 877C passes through the loop 876C. The third paddle lever 811C is held in place by a magnet 838A disposed in vertical registry with the third paddle lever 811C.

In alternative embodiments the loop 876C is placed between two upstanding walls provided on the body of the controller 810. The upstanding walls each comprise an aperture or recess, the pin may then be inserted through the apertures in the upstanding walls and the loop 876C. In some embodiments the pin 877C may be a sprung loaded bar having at least one end pin which is biased to be in an extended condition. The end pin may be compressed (into the bar) such that it may pass between the upstanding walls in a compressed state and then when aligned with the apertures or recesses in the upstanding walls the end pin returns to the extended condition so as to secure the pin and paddle lever 811C to the controller 810.

Figure 16D:
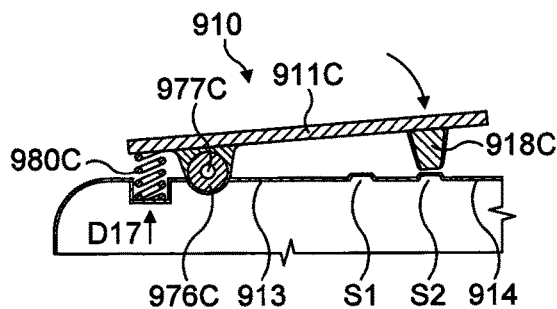
FIG. 16D is a sectional view of a ninth mounting arrangement for releasably coupling actuators to a games controller according to a tenth embodiment.

FIG. 16D illustrates a sectional view of the rear of a games controller 910 according to a tenth embodiment of a mounting arrangement for detachably coupling actuators to the controller 910. The controller 910 comprises four actuators a first paddle lever (not shown), a second paddle lever (not shown), a third paddle lever 911C and a fourth paddle lever (not shown), mounted on the rear of the controller 910.

In the embodiment of FIG. 16D, the actuators 911C are detachably mounted to the controller 910 by a securing mechanism comprising a loop 976C and a pin 977C in a similar fashion to that described above in relation to the embodiment of FIG. 160. The loop 976C is provided at a location distal from a first end of the third paddle lever 911C. A spring 980C may be mounted to the controller 910 in vertical registry with a region of the third paddle lever 911C, said region being located between the first end of the third paddle lever 911C and the pivot point defined by the loop 986C. The spring 980C may be arranged to bias the third paddle lever 911C to an initial or rest position. In some embodiments the spring 980C biases the first end of the third paddle lever 911C towards the outer surface of the body 914 of the controller 910. In other embodiments, the spring 980C biases the first end of the third paddle lever 911C away from the outer surface of the body 914 of the controller 910.

In alternative embodiments the pin 977C may comprise a torsional spring mechanism, torsion bar or leaf spring or other suitable bias device for biasing the third paddle lever 911C to an initial or rest position.

Figure 17A:
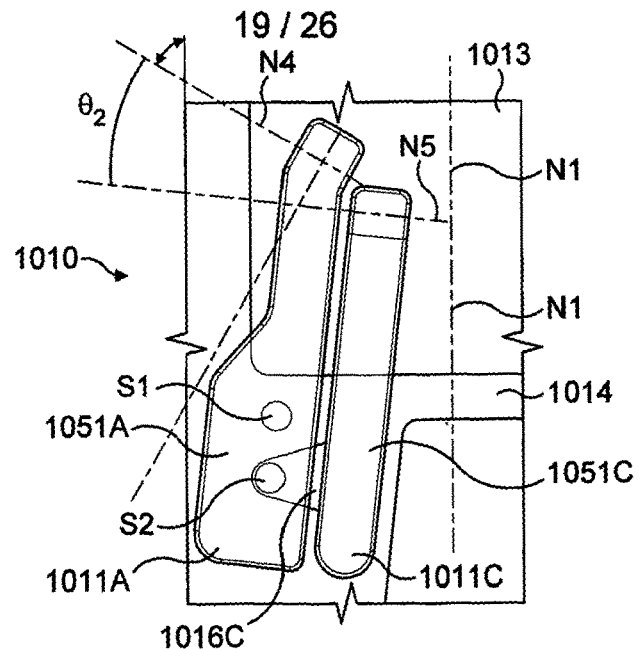
FIG. 17A is a perspective view from below of a portion of a rear panel of the games controller showing a tenth mounting arrangement for releasably coupling actuators to a games controller according to an eleventh embodiment.
Figure 17B:
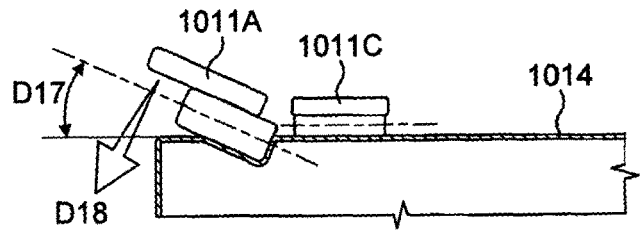
FIG. 17B is an end view from below of a portion of the rear panel of the games controller of FIG. 17A.

FIGS. 17A and 17B illustrate a portion of the rear of a games controller 1010 including an eleventh embodiment of a mounting arrangement for detachably coupling actuators to the controller 1010. The controller 1010 comprises four actuators: a first paddle lever 1011A, a second paddle lever (not shown), a third paddle lever 1011C and a fourth paddle lever (not shown), mounted on the rear of the controller 1010.

The mounting arrangement will be described with reference to the first and third paddle levers 1011A, 1011C. It will be understood that a similar, albeit mirror image, mounting arrangement is provided for coupling the second and fourth paddle levers (not shown) to the controller 1010.

The third paddle lever 1011C comprises a first wing 1016C and the fourth paddle lever (not shown) comprises a second wing (not shown).

The first wing 1016C extends from a first lateral edge of the tail portion 1051C of the third paddle lever 1011C below the tail portion 1051A of the first paddle lever 1011A. The first wing 1016C is arranged to activate one of a pair of switch mechanisms S1, S2 disposed in vertical registry with the tail portion 1051A of the first paddle lever 1011A.

The first and third paddle levers 1011A, 1011C are pivotally coupled to the rear of a controller 101C, for example employing a trunnion in a cradle as described with reference to the fifth embodiment of FIGS. 11 to 14B.

The first paddle lever 1011A pivots about a first axis indicated by dashed line N4. The third paddle lever 1011C pivots about a second axis indicated by dashed line N5.

The first and second pivotal axes are each orientated at a non-zero angle with respect to a longitudinal direction of the controller 1010. The longitudinal direction is indicted by dashed line N1 and extends substantially between the top and bottom of the controller 1010. In the illustrated embodiment the first and second pivotal axes are each arranged to define a non-zero angle with respect to a transverse direction of the controller 1010. The transverse direction, which is perpendicular to the longitudinal direction indicted by dashed line N1, extends substantially between the opposed sides of the controller 1010.

The first and second pivotal axes are arranged to define a non-zero angle $\theta_2$ therebetween.

Figure 17C:
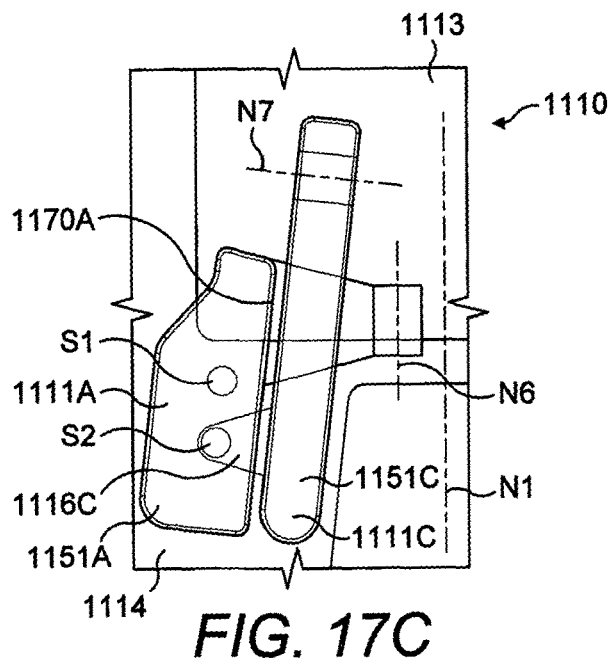
FIG. 17C is a perspective view from below of a portion of a rear panel of the games controller showing an eleventh mounting arrangement for releasably coupling actuators to a games controller according to a twelfth embodiment.

FIG. 17C illustrates a portion of the rear of a games controller 1110 including an eleventh embodiment of a mounting arrangement for detachably coupling actuators to the controller 1110. The controller 1110 comprises four actuators: a first paddle lever 1111A, a second paddle lever (not shown), a third paddle lever 1111C and a fourth paddle lever (not shown), mounted on the rear of the controller 1110.

The mounting arrangement will be described with reference to the first and third paddle levers 1111A, 1111C. It will be understood that a similar, albeit mirror image, mounting arrangement is provided for coupling the second and fourth paddle levers (not shown) to the controller 1110.

The third paddle lever 1111C comprises a first wing 1116C and the fourth paddle lever (not shown) comprises a second wing (not shown).

The first wing 1116C extends from a first lateral edge of the tail portion 1151C of the third paddle lever 1111C below the tail portion 1151A of the first paddle lever 1111A. The first wing 1116C is arranged to activate one of a pair of switch mechanisms S1, S2 disposed in vertical registry with the tail portion 1151A of the first paddle lever 1111A.

The first and third paddle levers 1111A, 1111C are pivotally coupled to the rear of a controller 1110, for example employing a trunnion in a cradle as described with reference to the fifth embodiment of FIGS. 11 to 14B.

The first paddle lever 1111A pivots about a first axis indicated by dashed line N7. The third paddle lever 1111C pivots about a second axis indicated by dashed line N6.

The first pivotal axis is orientated at a non-zero angle with respect to a longitudinal direction of the controller 1110. The longitudinal direction is indicted by dashed line N1 and extends substantially between the top and bottom of the controller 1110. In the illustrated embodiment the first pivotal axis is arranged to define a non-zero angle with respect to a transverse direction of the controller 1110. The transverse direction, which is perpendicular to the longitudinal direction indicated by dashed line N1, extends substantially between the opposed sides of the controller 1110.

The second pivotal axis is orientated to be substantially parallel with respect to a longitudinal direction of the controller 1110 as indicted by dashed line N1.

The first and second pivotal axes are arranged to define a non-zero angle therebetween.

The first paddle lever 1111A comprises a first portion 1172A which is pivotally mounted to the controller 1110. The first paddle lever 1111A comprises second portion 1151A which is laterally spaced apart from and coupled to the first portion 1172A by an intermediate portion 1170A. The second portion 1151A is divergently arranged with respect to the intermediate portion 1170A. The second portion 1151A extends substantially longitudinally with respect to the controller 1110; that is to say, substantially in a direction extending between the top and bottom of the controller 1110. The intermediate portion 1170A extends substantially transversely with respect to the controller 1110; that is to say, substantially in a direction extending between the opposed sides (in the embodiment of FIG. 3, the opposed sides are defined by the first and second handles $H_R$, $H_L$) of the controller 1110. The intermediate portion 1170A extends substantially from a first end of the first portion 1151A. The first end of the first portion 1151A is disposed in closer proximity to the top of the controller 1110 than a second opposing end of the first portion 1151A.

The third paddle lever 1111C is configured to be in overlapping relationship with the intermediate portion 1170A of the first paddle lever 1111A. An intermediate portion 1170C extends over the intermediate portion 1170A of the first paddle lever 1111A. That is to say, the intermediate portion 1170A of the first paddle lever 1111A is disposed between the intermediate portion 1170C of the third paddle lever 1111C and the outer surface of the rear panel of the controller 1110.

Referring now to FIGS. 19 to 25, there are shown an alternative embodiment. In the fourteenth illustrated embodiment like numerals have, where possible, been used to denote like parts, albeit with the addition of the prefix "1300" to indicate that these features belong to the fourteenth embodiment. The alternative embodiment shares many common features with the previous embodiments and therefore only the differences from the embodiments illustrated in FIGS. 1 to 18 will be described in any greater detail.

Figure 19:
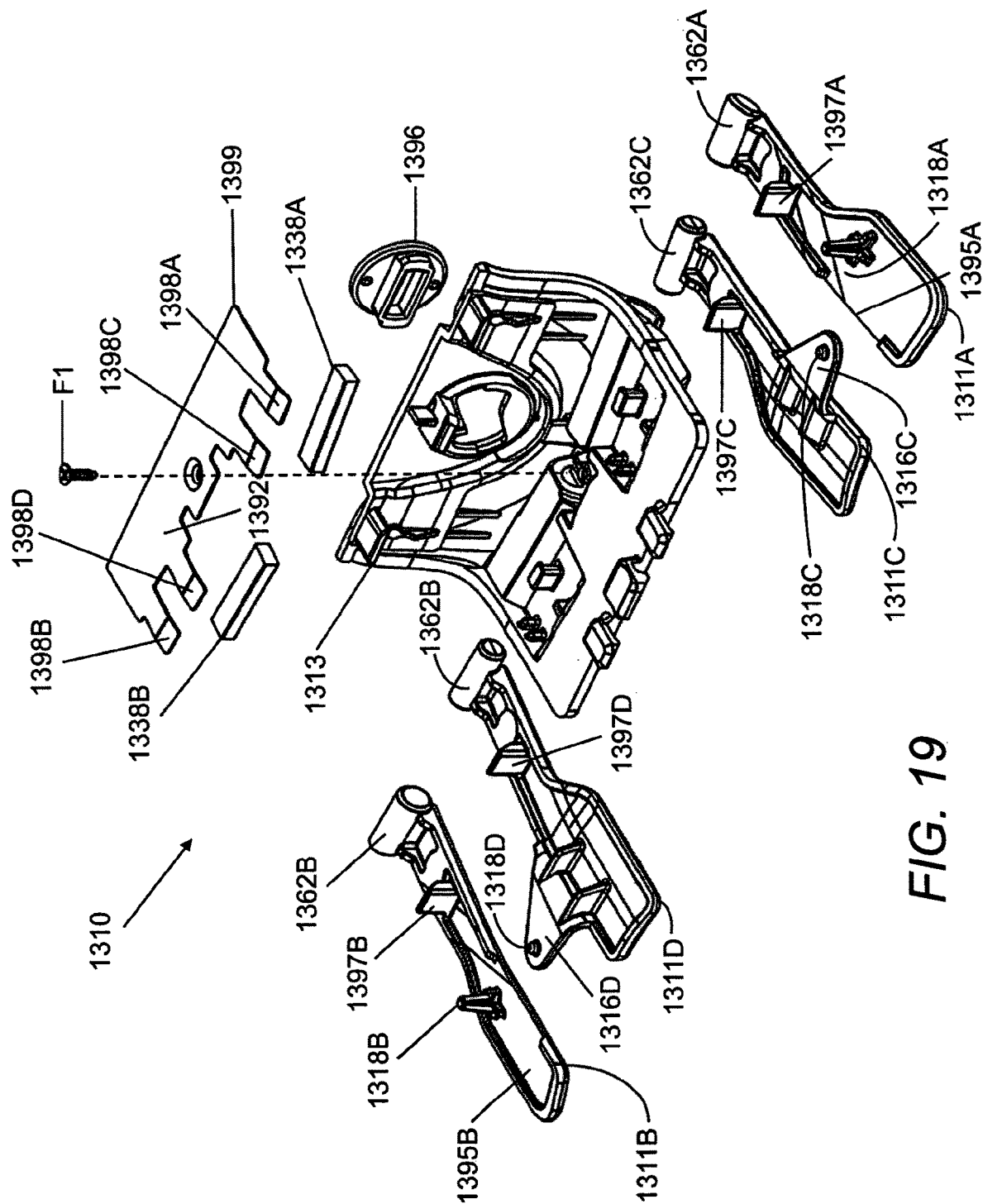
FIG. 19 is an exploded perspective view of a portion of a rear panel of a games controller according to another embodiment of the invention.
Figure 20:
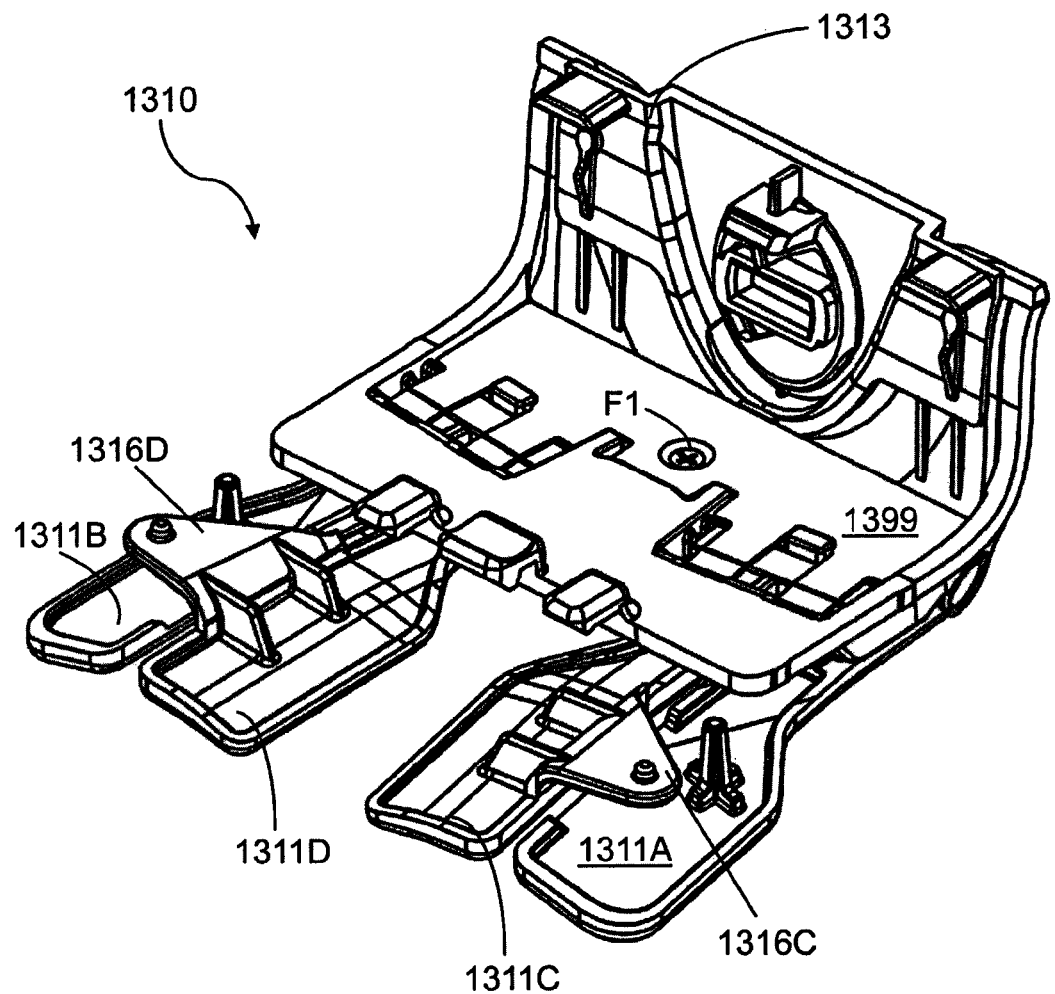
FIG. 20 is a perspective view of a portion of a rear panel of a games controller according to the embodiment of FIG. 19.
Figure 21:
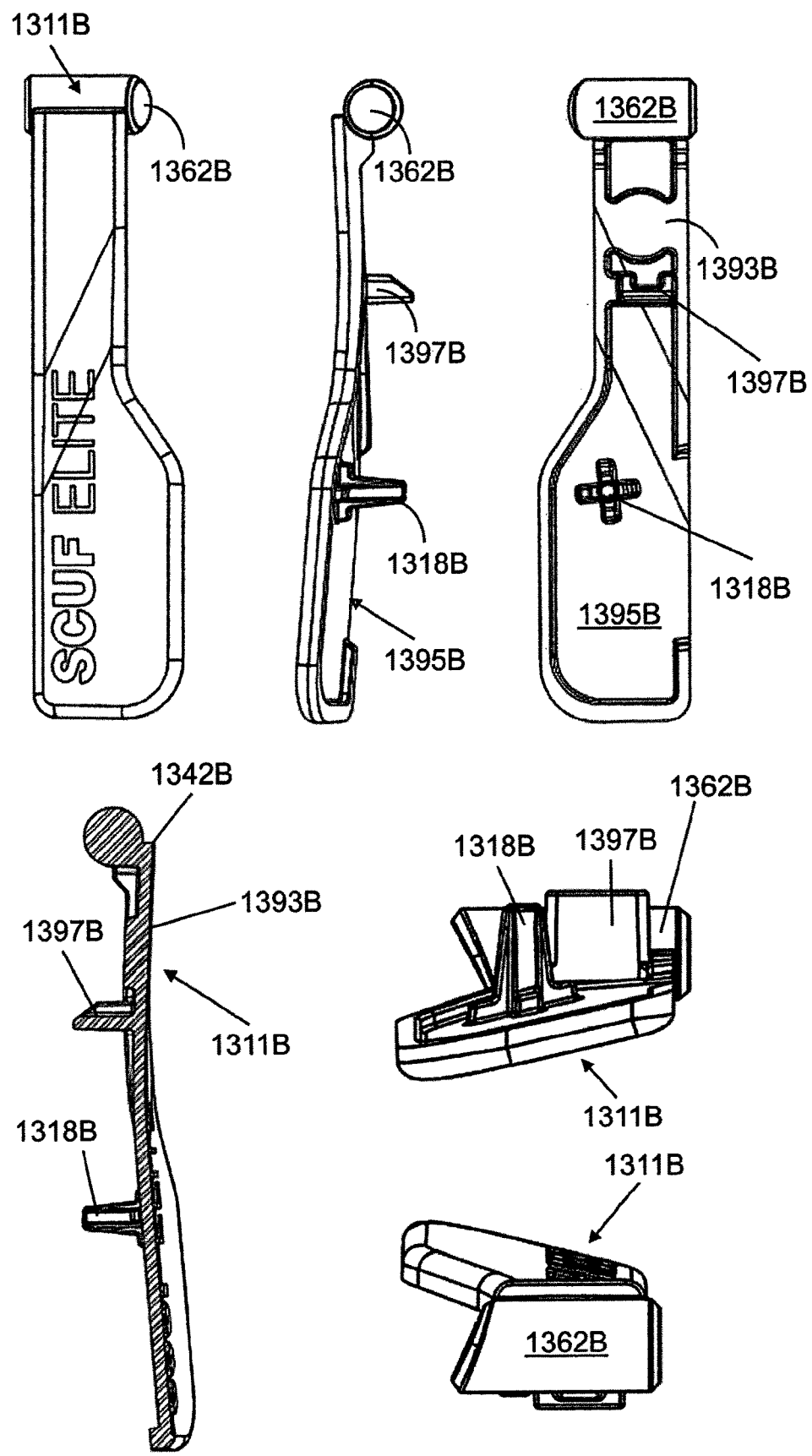
FIG. 21 shows side, end and plan views of a first actuator for use in the embodiment of FIG. 19.
Figure 22:
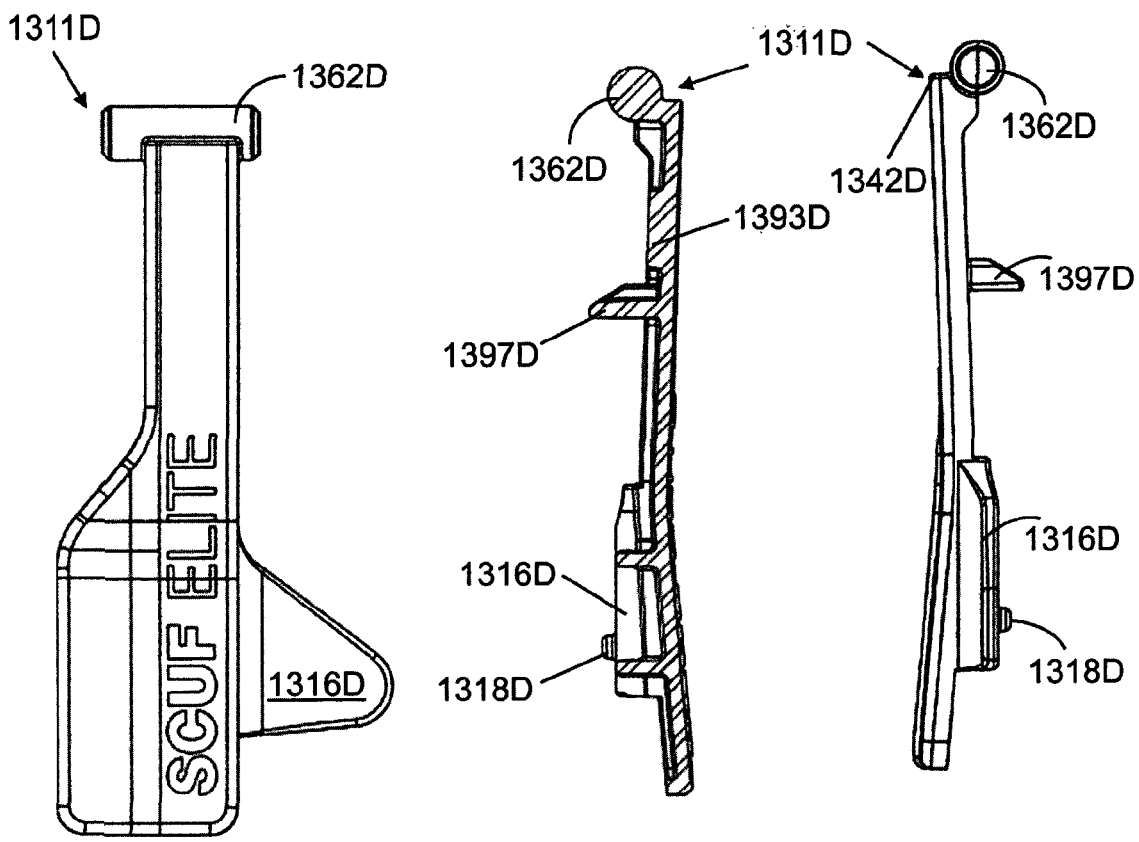
FIG. 22 shows side, end and plan views of a second actuator for use in the embodiment of FIG. 19.
Figure 22:
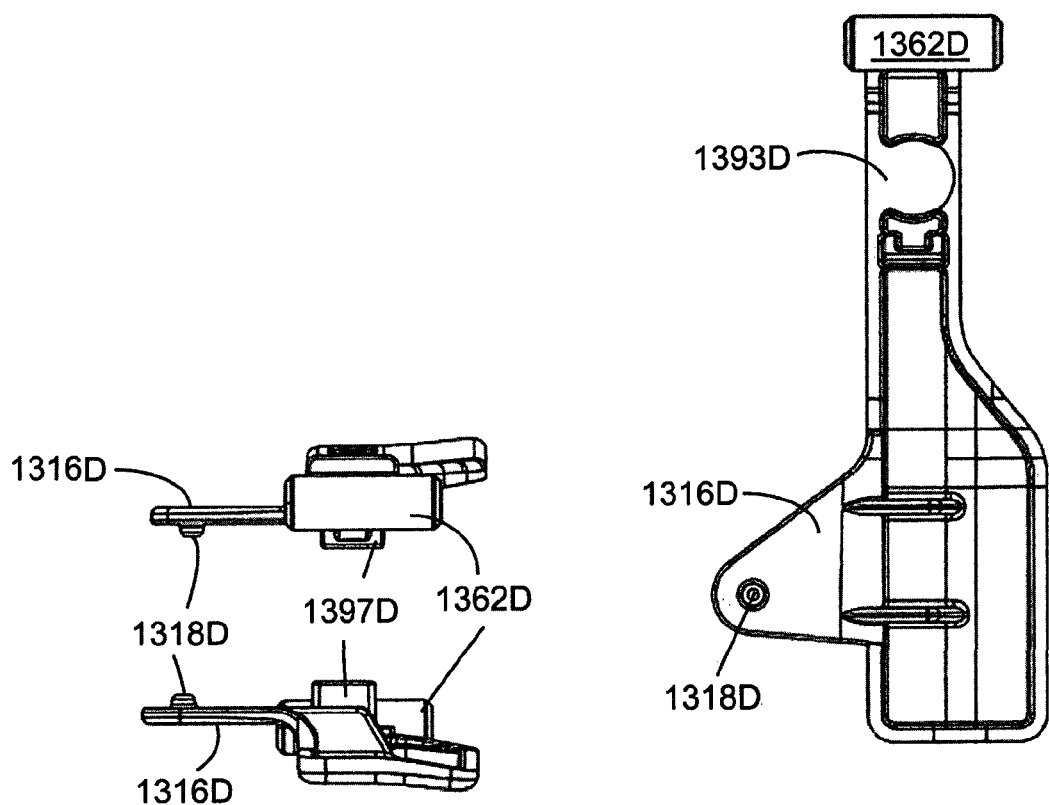
Figure 23:
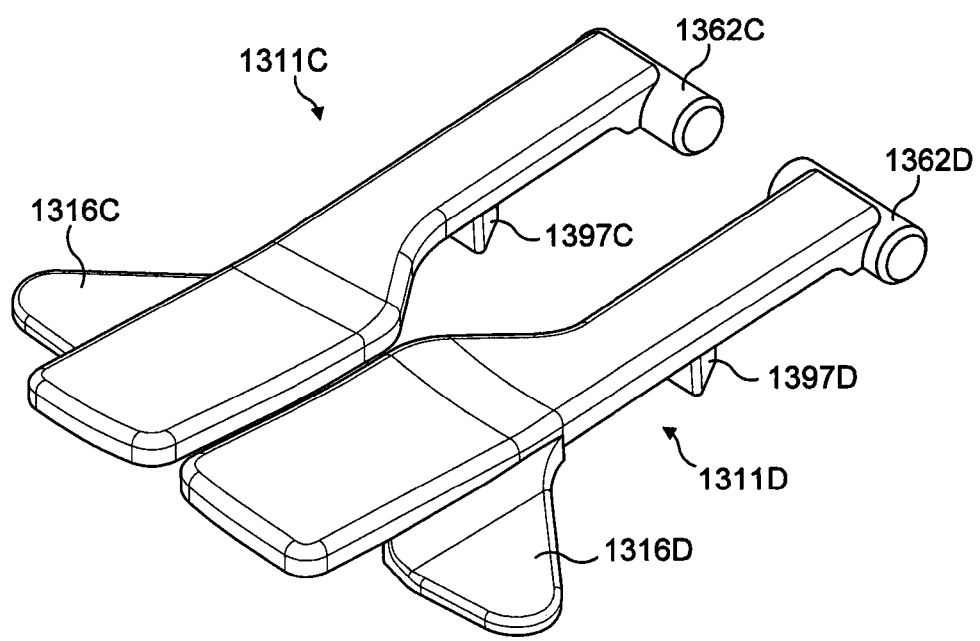
FIG. 23 is a perspective view of the second actuator of FIG. 22.

FIGS. 19 and 20 illustrate a portion of the rear of a games controller 1310 including yet another embodiment of a mounting arrangement for detachably coupling actuators to the controller 1310. FIGS. 19 and 20 illustrate an upper (when the controller is in normal use) or inner surface of the portion of the rear of the games controller 1310.

The controller 1310 comprises four actuators: a first paddle lever 1311A, a second paddle lever 1311B, a third paddle lever 1311C and a fourth paddle lever 1311D, mounted on the rear of the controller 1310. The four actuators may be constructed at least in part from a metallic material, the metallic material may be magnetic or susceptible to a magnetic field. The actuator may comprise a ferrous material; that is to say the material can be magnetized. The actuators may comprise a ferromagnetic material such as but not limited to; iron, nickel, cobalt.

In other embodiments other material may be employed, such as but not limited to plastics materials.

The third and fourth paddle levers 1311C, 1311D comprise a first wing 1316C and a second wing 1316D respectively.

The first wing 1316C extends from a lateral edge of a tail portion 1351C of the third paddle lever 1311C below a tail portion 1351A of the first paddle lever 1311A. A first recess or cutaway 1295A is provided in the inner surface of the first paddle lever 1311A to accommodate the first wing 1316C. The first wing 1316C is arranged to activate one of a pair of switch mechanisms (not shown) disposed in vertical registry with the tail portion 1351A of the first paddle lever 1311A.

The second wing 1316D extends from a lateral edge of the tail portion 1351D of the fourth paddle lever 1311D below the tail portion 1351B of the second paddle lever 1311B. A second recess or cutaway 1295B is provided in the inner surface of the second paddle lever 1311B to accommodate the second wing 1316D. The second wing 1316D is arranged to activate one of a pair of switch mechanisms (not shown) disposed in vertical registry with the tail portion 1351B of the second paddle lever 1311B.

Each paddle lever 1311A, 1311B, 1311C, 1311D comprises a substantially cylindrical end portion at a first end of a main body of the paddle lever 1311A, 1311B, 1311C, 1311D. The cylindrical end portion 1362A, 1362B, 1362C, 1362D forms a trunnion, which enables the paddle levers 1311A, 1311B, 1311C, 1311D to be mounted on the controller 1310, and operates as a pivot point about which the paddle levers 1311A, 1311B, 1311C, 1311D may be rotated. The main bodies of the paddle levers 1311A, 1311B, 1311C, 1311D are offset with respect to the tubular axis of the end portions 1362A, 1362B, 1362C, 1362D. The main bodies of the paddle levers 1311A, 1311B, 1311C, 1311D extend over—or under in normal use—the end portions 1362A, 1362B, 1362C, 1362D; an end of the main bodies of the paddle levers 1311A, 1311B, 1311C, 1311D forms an endstop 1242, best illustrated in FIG. 24, for limiting rotational movement of the end portions 1362A, 1362B, 1362C, 1362D within the first and second channels.

Each paddle lever 1311A, 1311B, 1311C, 1311D comprises a protuberance or boss 1318A, 1318B, 1318C, 1318D respectively; the protuberances 1318A, 1318B, 1318C, 1318D are configured to engage with an outer surface of a switch mechanism. The outer surface of the switch mechanism may be offset, optionally inset with respect to the outer surface of the rear panel of the controller 1310. Optionally, the outer surface of the switch mechanism is inset by a distance less than the thickness of the rear panel.

The controller 1310 comprises a body portion (not shown) and a cover panel or hatch 1313. The hatch 1313 may be detachably mounted to the body portion.

The hatch 1313 comprises a first part of a complementary securing mechanism. In alternative embodiments the first part of a complementary securing mechanism may be mounted to, or integrally formed with, the body portion.

Figure 24:
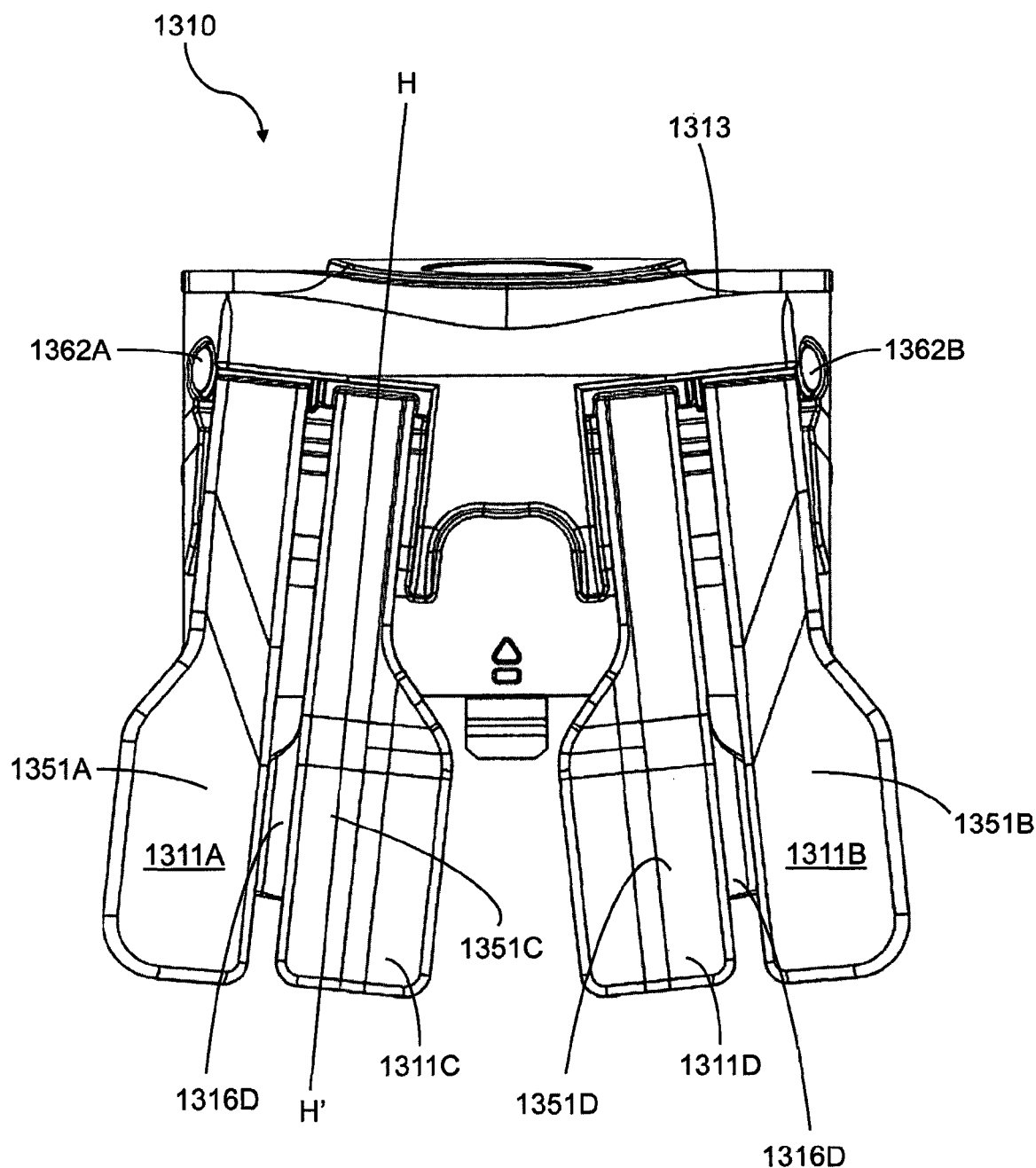
FIG. 24 is a plan view of a portion of a rear panel of a games controller according to the embodiment of FIG. 19.
Figure 25:
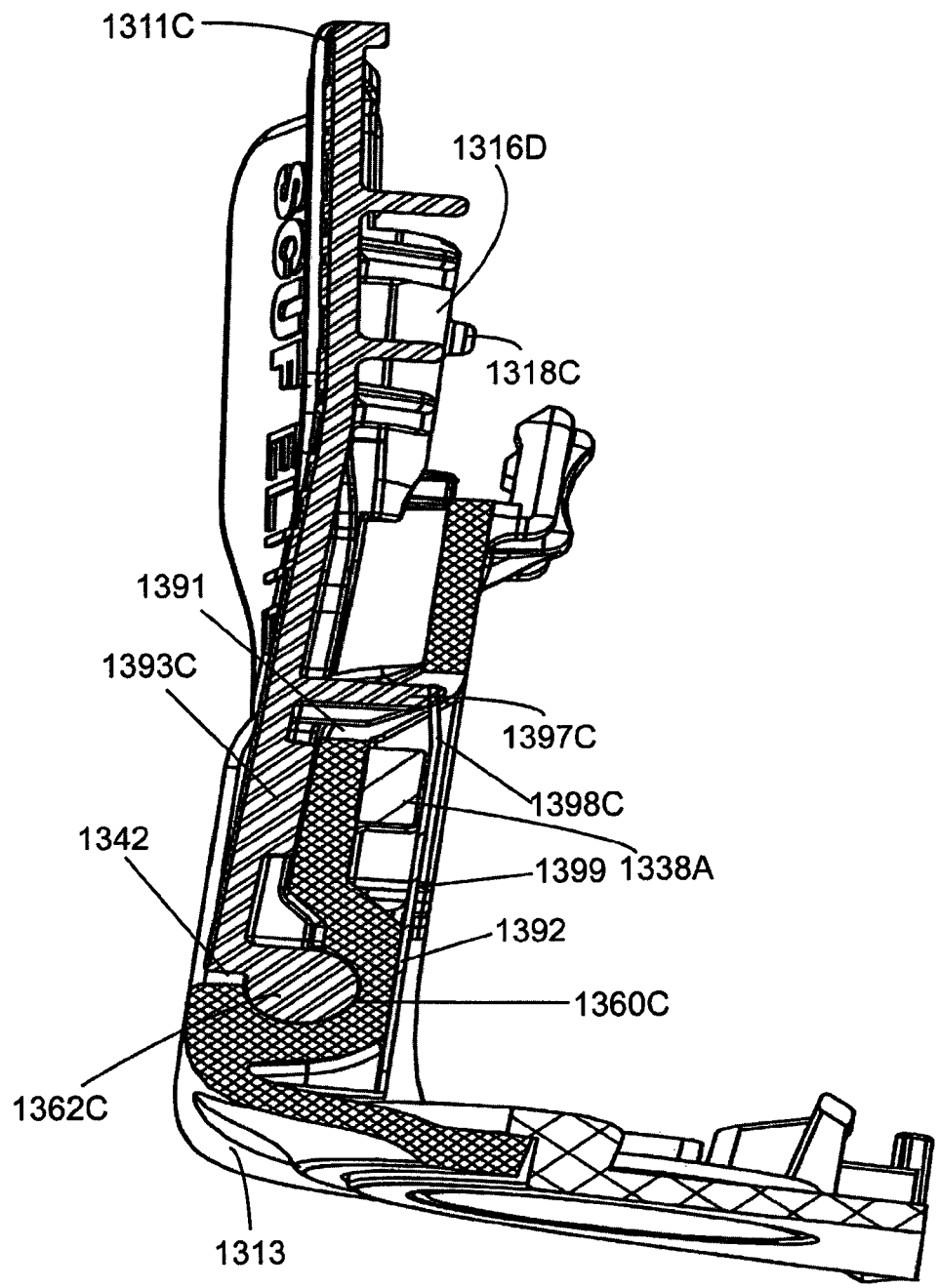
FIG. 25 is a view taken along the line HH' shown in FIG. 24.

The hatch 1313, best illustrated in FIG. 24, comprises a first trough or channel 1360A and a second trough or channel. The first channel 1360A is separated from the second channel by an upstand defining a first end wall and a second end wall in a similar manner to that described in relation to the embodiments of FIGS. 11 to 14B and FIG. 18. The first end wall closes an end of the first channel 1360A. The second end wall closes an end of the second channel.

Optionally, the first channel 1360A is arranged divergently with respect to the second channel.

The first channel 1360A and the second channel are arranged to be complementary in shape to the cylindrical end portion 1362A, 1362B, 1362C, 1362D of the paddle levers 1311A, 1311B, 1311C, 1311D. The first and second channels can be considered to define a circular bore having a longitudinal cutaway therealong—a partial cylinder—the longitudinal cutaway taking the form of a slot.

The first and second channels provide a cradle or receiver in which the cylindrical end portion 1362A, 1362B, 1362C, 1362D of the paddle levers 1311A, 1311B, 1311C, 1311D are received. The first and second channels are arranged such that the paddle levers 1311A, 1311B, 1311C, 1311D cannot be withdrawn through the longitudinal cutaway. The first and second channels The main body of each paddle lever 1311A, 1311B, 1311C, 1311D extends through the longitudinal cutaway in a respective one of the first and second channels.

The first channel 1360A comprises may comprise a first channel portion 464A having a first bore dimension or diameter and a third channel portion 464C having a third bore dimension or diameter. Optionally, the third channel portion of the first channel 1360A is smaller in dimension or diameter in a transverse direction than the first channel portion of the first channel 1360A. The second channel may be similarly arranged. In this way the first and second paddle levers 1311A, 1311B can be configured such that they cannot be inserted into the respective one of the third and fourth channel portions.

As illustrated in FIG. 24 the cylindrical end portion 1262C of the third paddle lever 1311C is received in the first channel 1360A. The first, second and fourth paddle levers 1311A, 1311B, 1311D may be similarly received by a respective one of the first and second channels.

The hatch 413 may comprise a pair of magnets 1338A, 1338B, such as, but not limited to, permanent magnets. A magnet 1338A, 1338B is located in vertical registry with each of a pair of adjacent the paddle levers 1311A/1311C, 1311B/1311D. Optionally the paddle levers 1311A, 1311B, 1311C, 1311D may comprise an engaging region 1293C (see FIG. 24) in which the paddle lever is provided with sufficient ferromagnetic material so as to provide the desired force of attraction. In the illustrate embodiment the engaging region 1293C is thicker than adjacent regions The magnets 1338A, 1338B, when present, pull or attract the paddle levers 1311A, 1311B, 1311C, 1311D towards the hatch 1313.

The magnets 1338A, 1338B may hold the paddle levers 1311A, 1311B, 1311C, 1311D to the hatch 1313.

In this way the magnets 1338A, 1338B may retain the paddle levers 1311A, 1311B, 1311C, 1311D, particularly the bosses 1318A, 1318B, 1318C, 1318D, in close proximity to a respective switch mechanism disposed within the controller 1310.

The magnets 1338A, 1338B may inhibit rotation of the paddle levers 1311A, 1311B, 1311C, 1311D away from the outer surface of the hatch 1313.

In order to remove the paddle levers 1311A, 1311B, 1311C, 1311D a user must overcome the force of attraction to rotate the paddle levers 1311A, 1311B, 1311C, 1311D away from the outer surface of the hatch 1313.

The force of attraction exerted upon the paddle lever 1311A, 1311B, 1311C, 1311D reduces or counters the return force on the paddle levers 1311A, 1311B, 1311C, 1311D which is applied by the switch mechanisms. The embodiment of FIGS. 19 to 25 provides an additional return force.

The additional return force is provided by a return bias mechanism 1399. The may be particularly beneficial when the paddle levers 1311A, 1311B, 1311C, 1311D are constructed entirely from a rigid material, as such paddle levers will be resistant to elastic deformation under forces sufficient to activate the switch mechanisms.

The return bias mechanism in the embodiment of FIG. 19 is formed by a leaf spring 1398A, 1398b, 1398C, 1398D, each of the leaf spring 1398A, 1398b, 1398C, 1398D is mounted to the inner surface of the hatch 1313. The leaf springs 1398A, 1398b, 1398C, 1398D may be each integrally formed with a mounting body 1392. The mounting body may be affixed to the inner surface of the hatch 1313. In the illustrated embodiment a mechanical fixing in the form of a screw is employed other fixing mechanisms may be employed such as but not limited to adhesive, bonding, or welding. The return bias mechanism 1399 may be formed from any suitable material capable of elastic deformation.

The return bias mechanism 1399 and/or the leaf springs 1398A, 1398b, 1398C, 1398D may be integrally formed with the hatch 1313 or other element forming the housing or chassis of the controller 1310.

Each of the paddle levers 1311A, 1311B, 1311C, 1311D may comprise a limb 1397A, 1397B, 1397C, 1397D. Each of the limbs 1397A, 1397B, 1397C, 1397D extend through an aperture or orifice 1391 in the hatch 1313. An end E of each limb 1397A, 1397B, 1397C, 1397D engages with a respective one of the leaf springs 1398A, 1398b, 1398C, 1398D.

In other embodiments alternative spring or bias mechanisms may be employed. For example but not limited to, a helical compression spring may be provided in a bore hole. The bore hole may be closed or blind at an innermost end thereof. The helical compression spring may engage with an inner surface of the paddle lever, or the paddle lever may comprise a limb to which the helical compression spring is seated. The paddle lever may comprise an integral bias mechanism. A region of the main body of the paddle lever may be adapted or constructed so as to allow elastic deformation. The paddle lever may be a composite of plastic and metallic materials.

The hatch 1313 may comprise a detachable or interchangeable indicia feature 1396 so as to allow customisation of the hatch 1313.

In the foregoing embodiments it will be appreciated the third and fourth paddle levers are configured to activate a switch mechanism which is laterally offset with respect to, or spaced apart from, an engaging surface to which a user applies an activation force to the actuator. In this way none of the engaging surface of the third and fourth paddle levers need be in vertical registry with the switch mechanism being activated.

The actuators comprise an engaging surface which is elongated in at least the longitudinal direction of the controller; a user may engage the actuators anywhere along the engaging surface. In this way the user may engage with the actuators at one of a plurality of positions which may be longitudinally offset with respect to the switch mechanism.

The foregoing embodiments enable the actuators to be mounted to the controller at a position which is offset in both a longitudinal direction and a transverse direction to a position at which a switch mechanism is located on the controller.

The foregoing embodiments provide a controller in which a pair of switch mechanisms are provided in vertical registry with a first actuator. The first actuator comprises a first engaging surface which is elongated in at least the longitudinal direction of the controller and configured to activate a first one of the pair of switch mechanisms. The controller comprises a second actuator comprising a second engaging surface which is elongated in at least the longitudinal direction of the controller. The second actuator is configured to activate a second one of the pair of switch mechanisms. Optionally, the first and second engaging surfaces are arranged to be substantially parallel with each other.

Optionally, the first and second engaging surfaces are arranged to overlap with each other in the longitudinal direction of the controller. In this way a user may place a single finger on both actuators simultaneously. Alternatively, a user need only move their finger in a transverse direction to move between the first and second engaging surfaces.

The second engaging surface of the second actuator may be disposed at a laterally offset position with respect to the first engaging surface of the first actuator. Optionally, the second engaging surface of the second actuator may be disposed inset towards the centre or middle of the controller with respect to the first engaging surface of the first actuator.

In some of the foregoing embodiments the actuators are pivotally mounted to the controller, the actuator comprising a lug for being received in a receiver which may be in the form of a conduit or channel, the lug being inserted into the receiver by linear translation along a longitudinal axis of the receiver, the longitudinal axis of the receiver defining a pivot axis about which the actuators rotate.

It is envisaged that the controllers may be coupled to a games console or computer by a wired connection or by a wireless connection device.

The actuators may be toollessly coupled to, and uncoupled from, the controller.

It can be appreciated that various changes may be made within the scope of the present invention. Whilst in the foregoing embodiments the actuator mechanism has been described with reference to a hand held games controller for use with a home video games console or other personal computer, in alternative embodiments the actuator mechanism may be employed with other hand held electronic devices, or example but not limited to a portable handheld games console (a single unit comprising the console, screen, speakers, and controls), a mobile telephone, tablet computer, phablet computer. The actuator mechanism may be integrated within such portable devices or may form part of an accessory apparatus such as, but not limited to, a case or caddy or other removable jacket arranged to accommodate the portable device.

In some embodiments the first and or second paddle levers may comprise a recess or cutaway on an inner surface thereof, the recess or cutaway being provided to receive the wing portion of the third or fourth paddle lever respectively.

It will be recognized that as used herein, directional references such as "top", "bottom", "front", "back", "end", "side", "inner", "outer", "upper" and "lower" do not limit the respective features to such orientation, but merely serve to distinguish these features from one another.

The invention claimed is:

1. An apparatus for supplying user inputs to a computer program, for controlling the computer program, comprising:
  a case;
  a plurality of controls located on a front of the apparatus;
  at least one first additional control located on a rear of the apparatus;
  at least one second additional control located on a rear of the apparatus;

the apparatus being shaped to be held in both hands of a user such that the user's thumbs are positioned to operate controls located on the front of the apparatus;

at least one first actuator mounted to the rear of the apparatus in a position operable by a middle, ring or little finger of a user; and at least one second actuator mounted to the rear of the apparatus in a position operable by a middle, ring or little finger of a user;

the first actuator is configured to activate the at least one first additional control;

the second actuator is configured to activate the at least one second additional control;

the second actuator comprising a lateral portion configured to be disposed in overlapping relationship with the first actuator such that the first lateral portion is disposed over one of the first additional control or second additional control.

2. The apparatus of claim 1 wherein the first actuator is pivotally coupled to the apparatus.

3. The apparatus of claim 1 wherein the second actuator is pivotally coupled to the apparatus.

4. The apparatus of claim 1 wherein the first actuator is removably mounted to the apparatus.

5. The apparatus of claim 1 wherein the second actuator is removably mounted to the apparatus.

6. The apparatus of claim 1 wherein the first actuator comprises a first boss extending from an inner surface thereof.

7. The apparatus of claim 6 wherein the second actuator comprises a second boss extending from an inner surface of the lateral portion thereof.

8. The apparatus of claim 7 wherein the first boss is longer than the second boss.

9. The apparatus of claim 1 comprising a plurality of controls located on a top of the apparatus, the apparatus being shaped to be held in both hands of a user such that the user's index fingers are positioned to operate controls located on the top of the apparatus.

10. An actuator for use with apparatus for supplying user inputs to a computer program for controlling the computer program, the apparatus comprising:
a case;
a plurality of controls located on a front of the apparatus;
at least one first additional control located on a rear of the apparatus; and
at least one second additional control located on a rear of the apparatus;
the apparatus being shaped to be held in both hands of a user such that the user's thumbs are positioned to operate controls located on the front of the apparatus;
the actuator being configured to activate the at least one first additional control and being operable by a middle, ring or little finger of a user, the actuator comprising a first portion configured to be disposed in overlapping relationship with a further actuator for activation of the at least one second additional control.

11. The apparatus of claim 1 wherein the first actuator comprises a paddle lever.

12. The apparatus of claim 1 wherein the second actuator comprises a paddle lever.

13. The apparatus of claim 1 wherein the first actuator is comprised of a material configured to deform when activated by a user to engage the first additional control.

14. The apparatus of claim 1 wherein the second actuator is comprised of a material configured to deform when activated by a user to engage the second additional control.

15. The apparatus of claim 1 wherein the first additional control and second additional control are flush with the case at the rear of the apparatus.

16. The apparatus of claim 1 wherein first additional control and second additional control are recessed into the case at the rear of the apparatus.

17. The apparatus of claim 1, further comprising:
a magnet exerting a retention force upon the first actuator so as to hold the first actuator in a position proximate the rear of the apparatus; and
a return bias mechanism exerting a biasing force in opposition to the retention force.

18. The apparatus of claim 17 wherein the biasing force exerted by the return bias mechanism is less than retention force exerted by the magnet.

19. The apparatus of claim 17 wherein at least one first additional control comprise a switch mechanism including return bias device, and wherein the biasing force exerted by the return bias mechanism and the biasing force exerted by the return bias device of the switch mechanism is less than or equal to the retention force exerted by the magnet.

20. The apparatus of claim 17 wherein the first actuator comprises a limb extending into an orifice in the case so as to engage with the return bias mechanism.

* * * * *